A. RECHNITZER.
CALCULATOR.
APPLICATION FILED JULY 17, 1905. RENEWED JUNE 13, 1918.
1,292,513.
Patented Jan. 28, 1919.
17 SHEETS—SHEET 2.
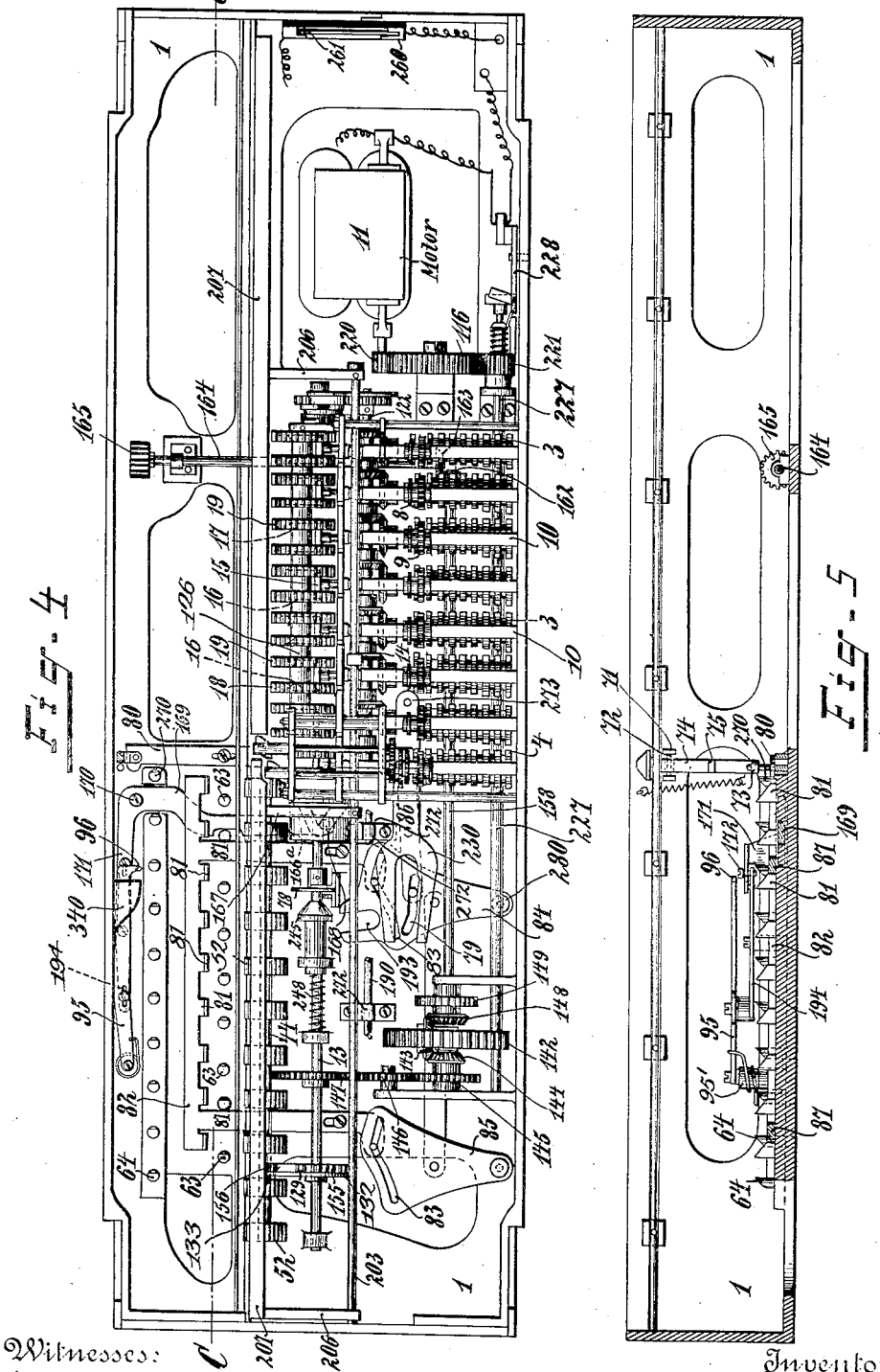

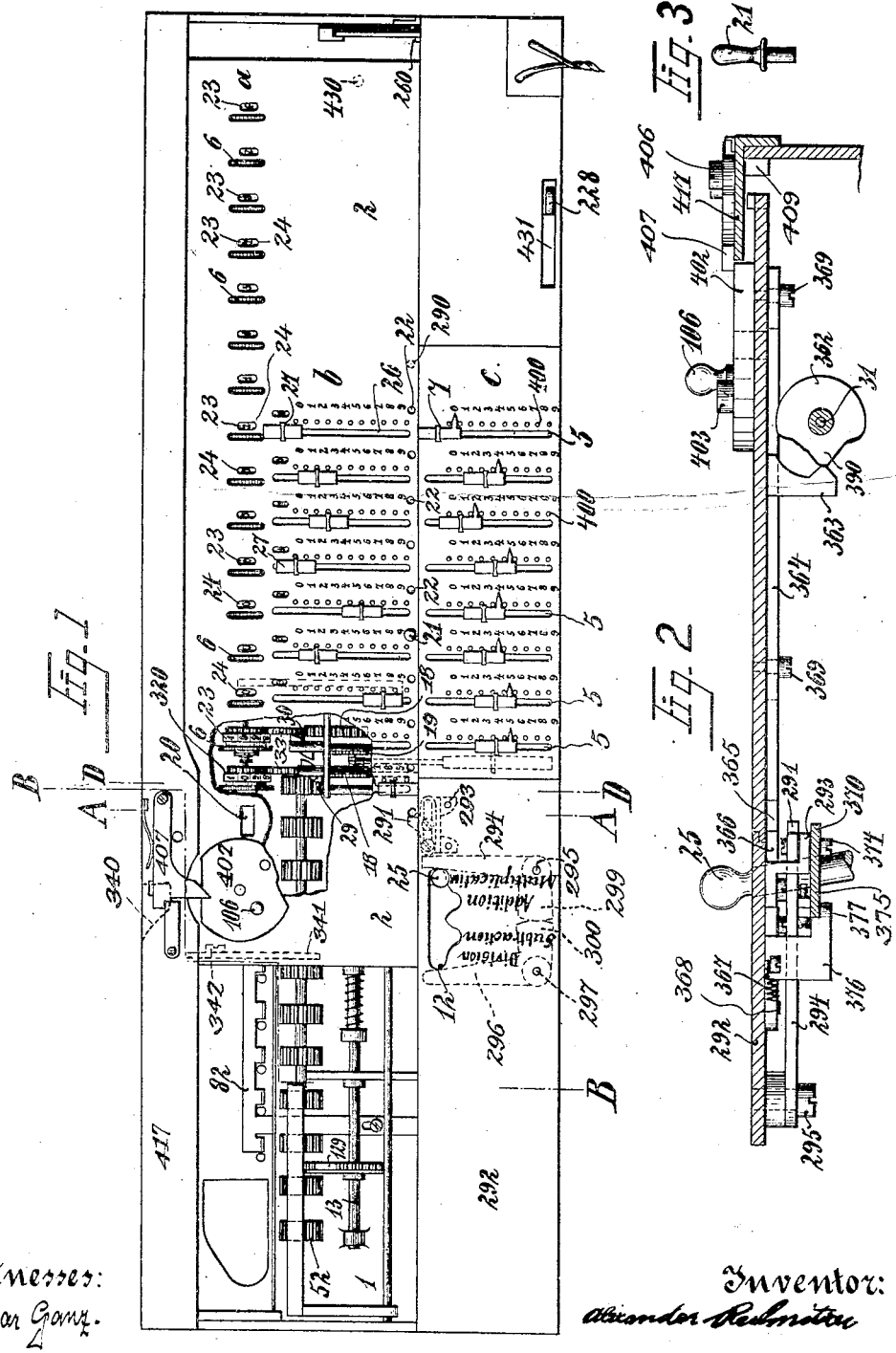

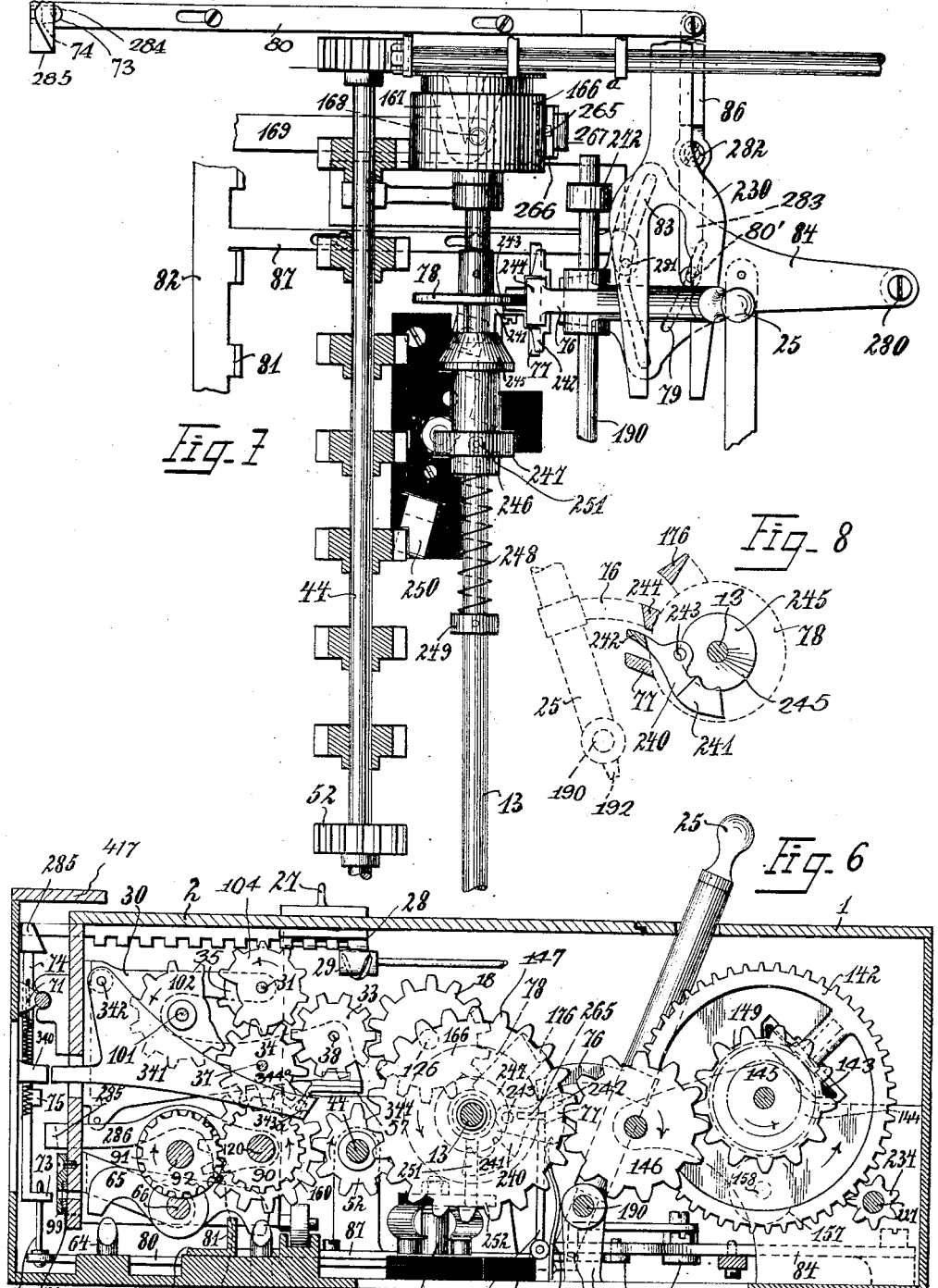

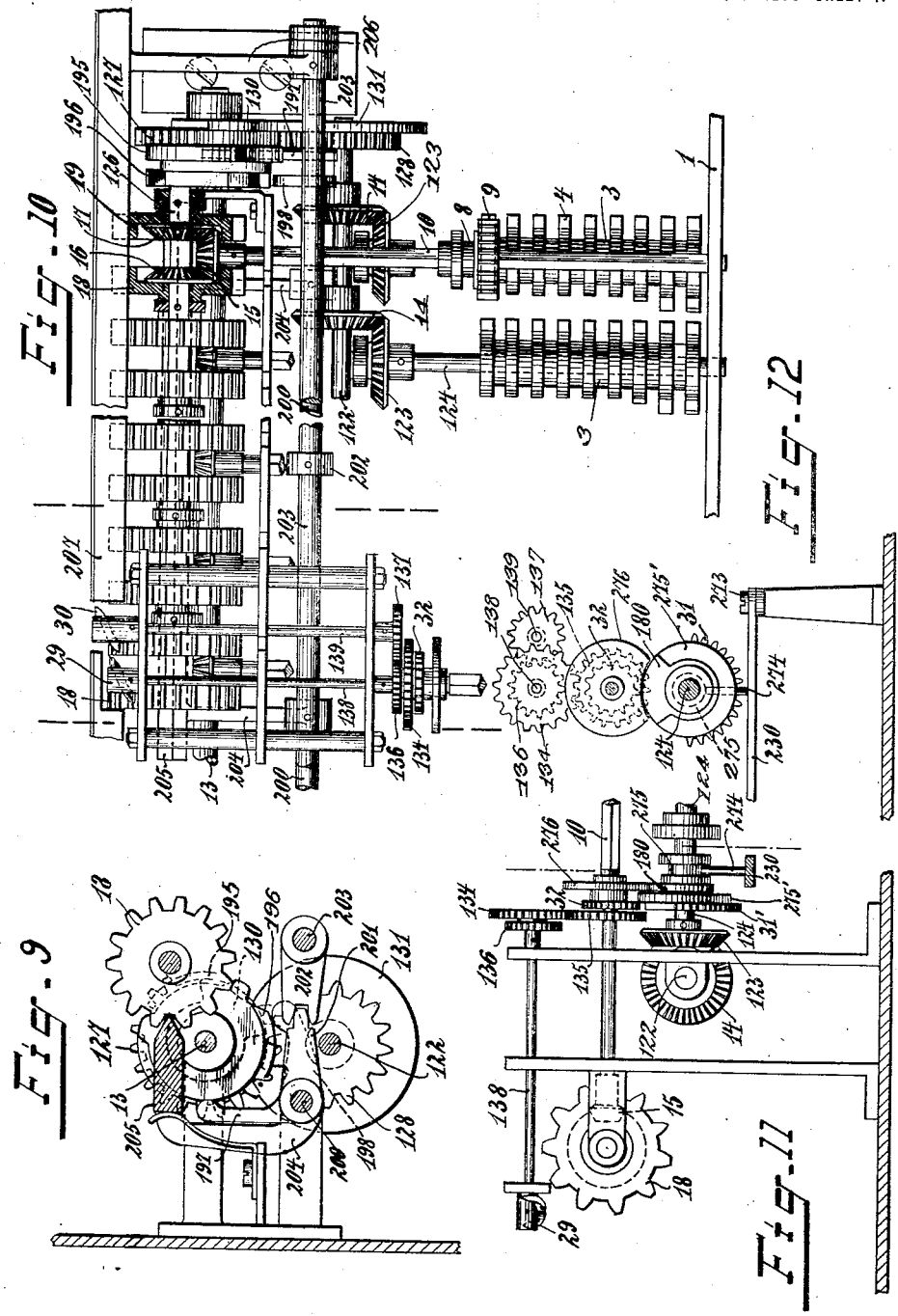

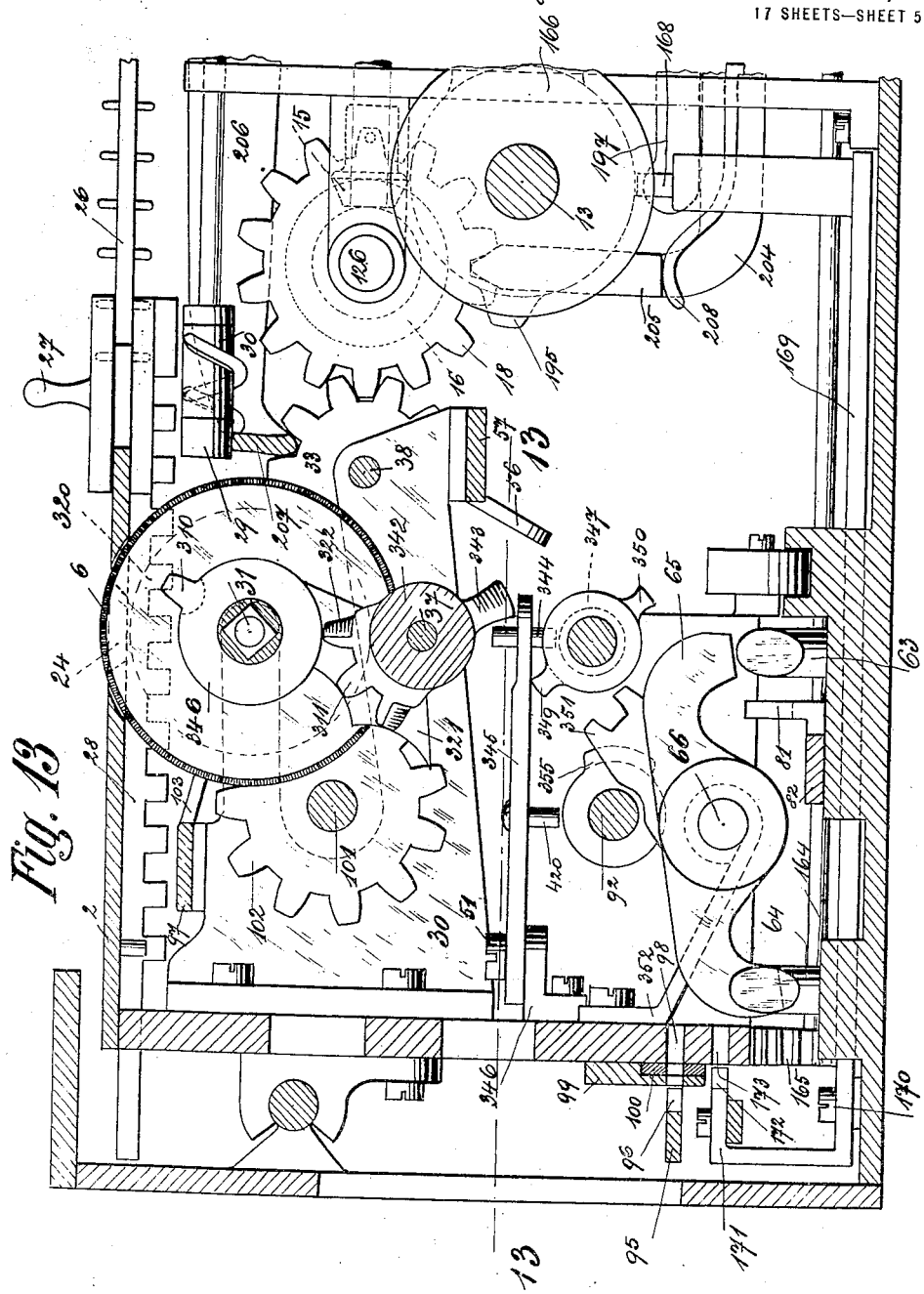

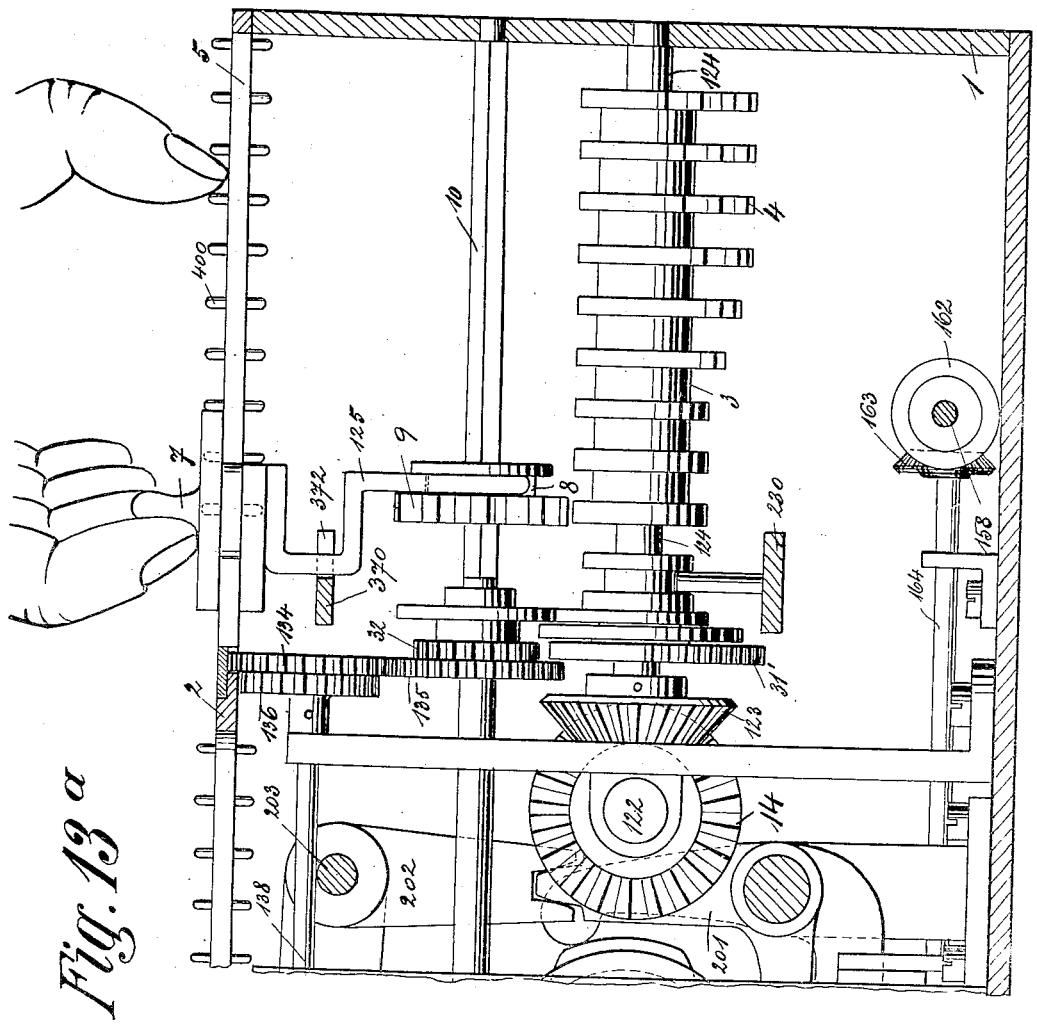

A. RECHNITZER.
CALCULATOR.
APPLICATION FILED JULY 17, 1905. RENEWED JUNE 13, 1918.
1,292,513.
Patented Jan. 28, 1919.
17 SHEETS—SHEET 7.
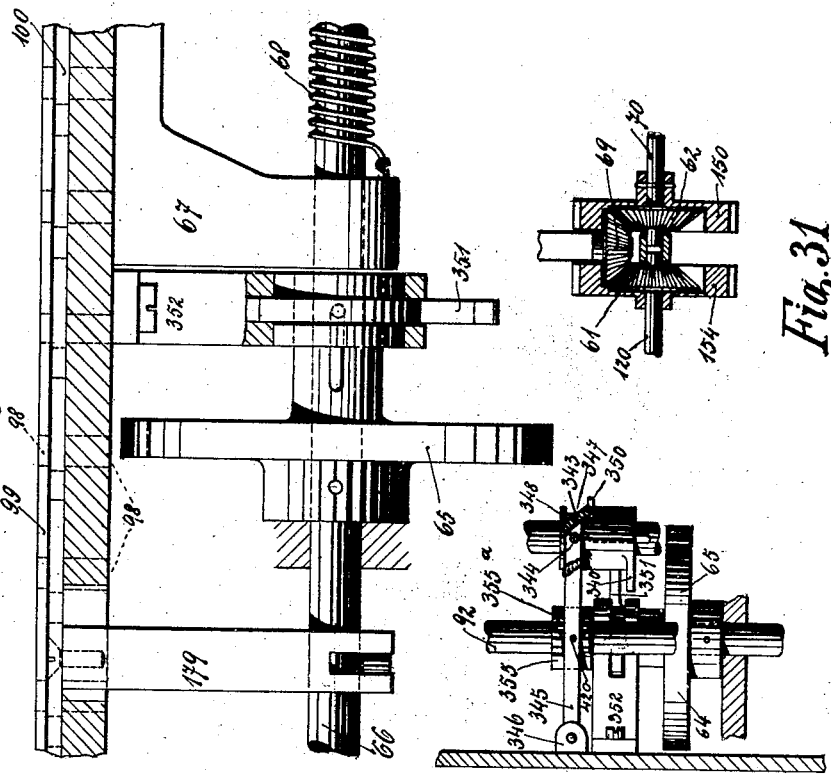
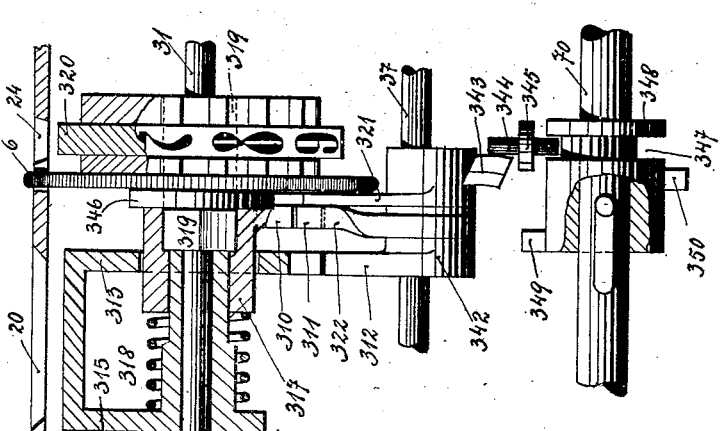
Witnesses:
C. T. Neal
G. A. Wheelock
Alexander Rechnitzer
Inventor:
by Emerson Litewell
Attorney.

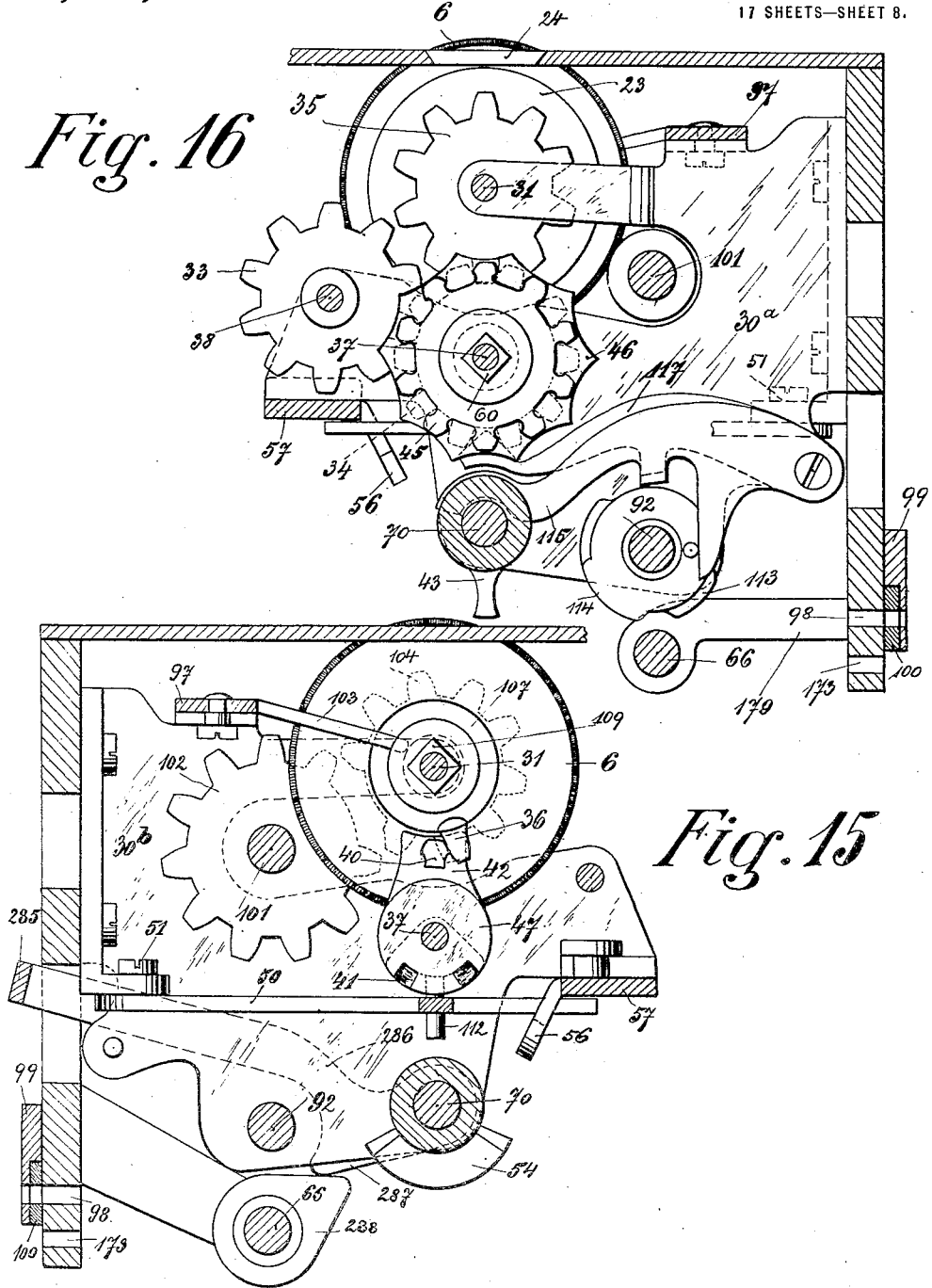

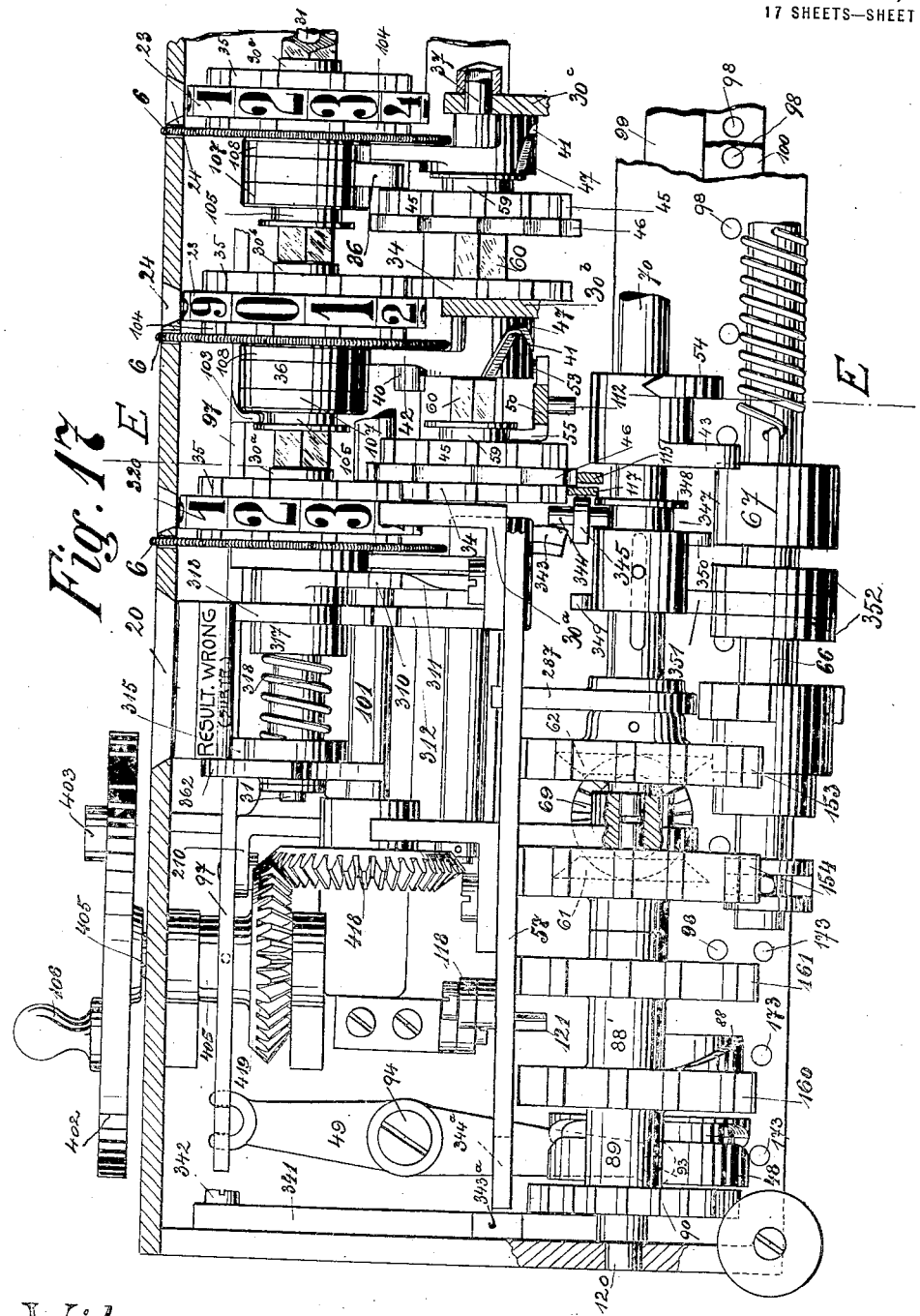

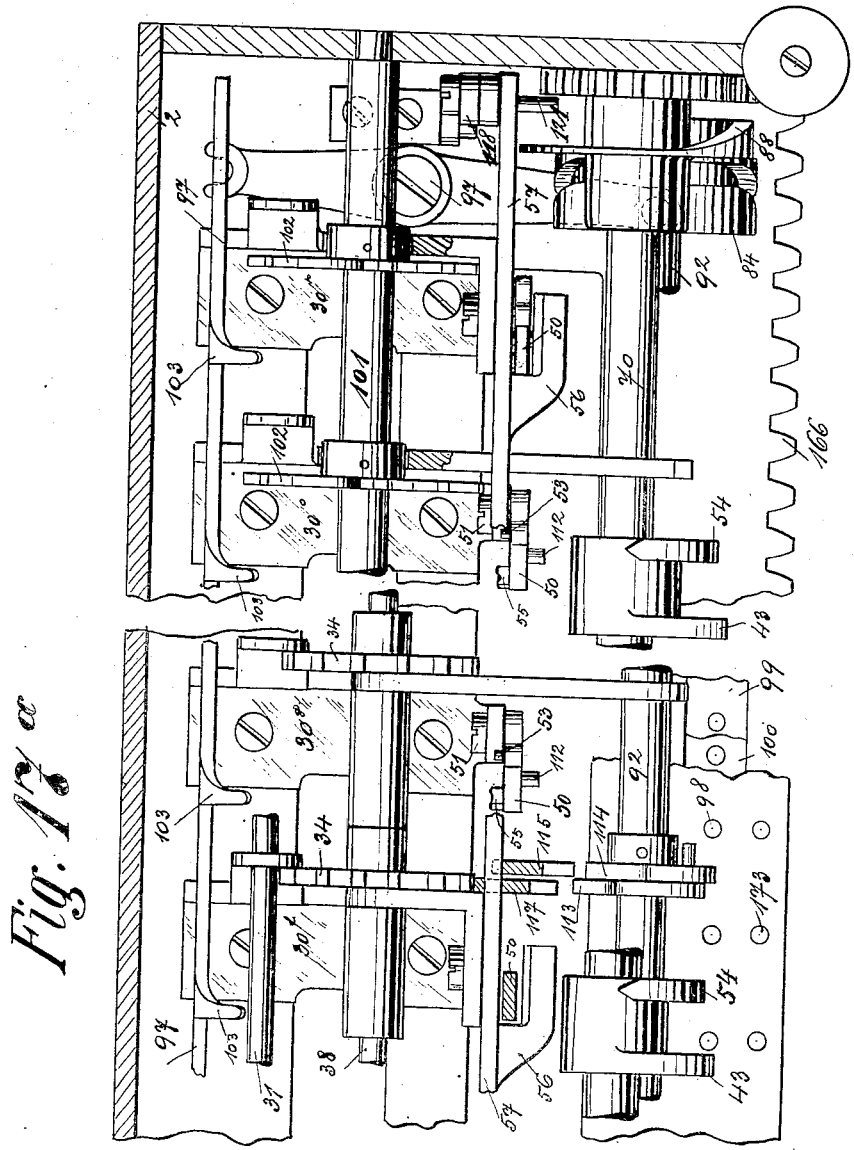

A. RECHNITZER.
CALCULATOR.
APPLICATION FILED JULY 17, 1905. RENEWED JUNE 13, 1918.

1,292,513.

Patented Jan. 28, 1919.

Witnesses:
C. T. Neal
Beatrice Minns

Inventor:
Alexander Rechnitzer
by Emerson R. Newell
Attorney

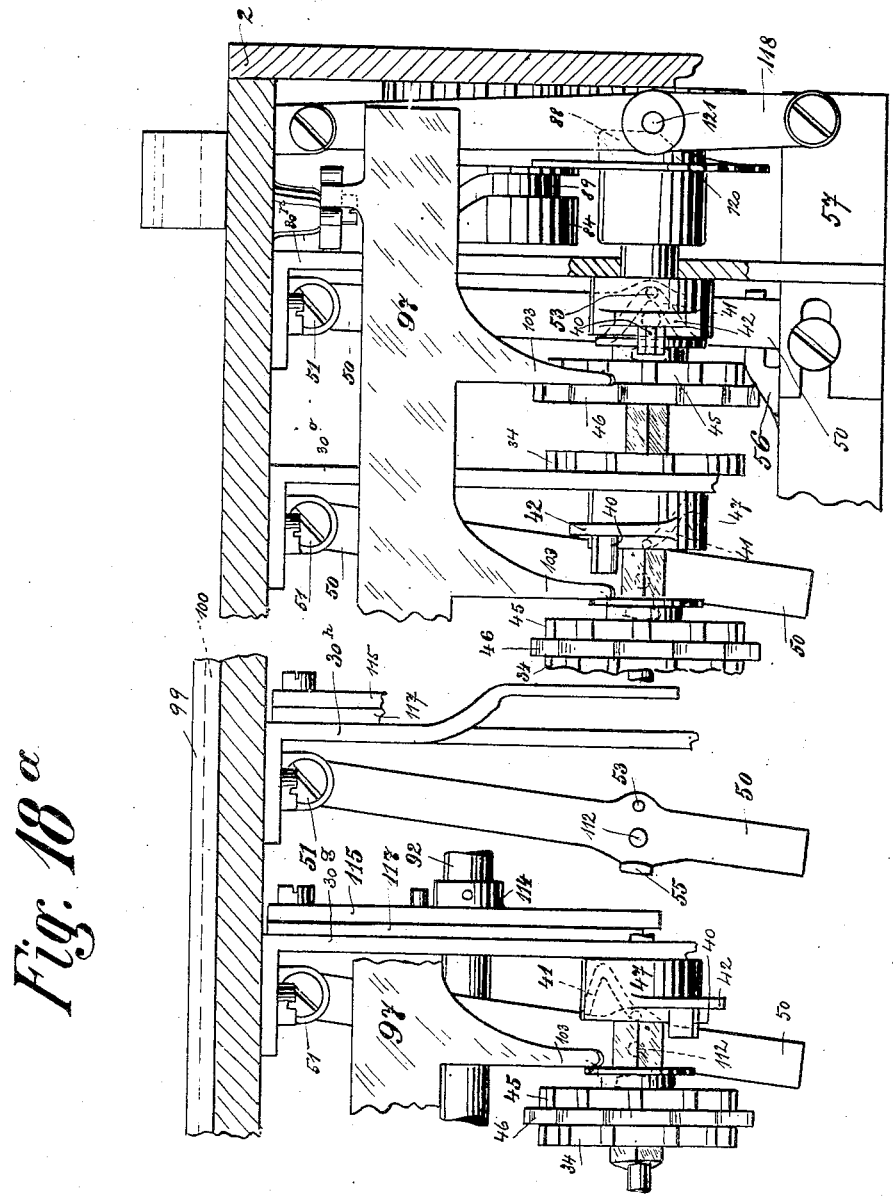

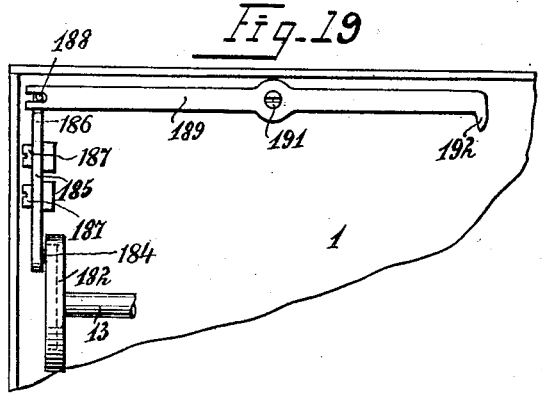
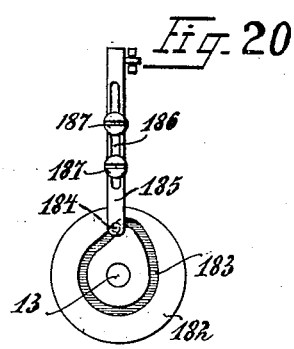
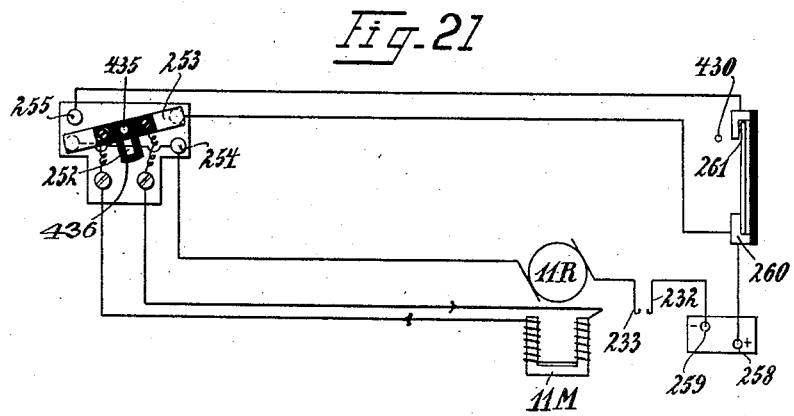
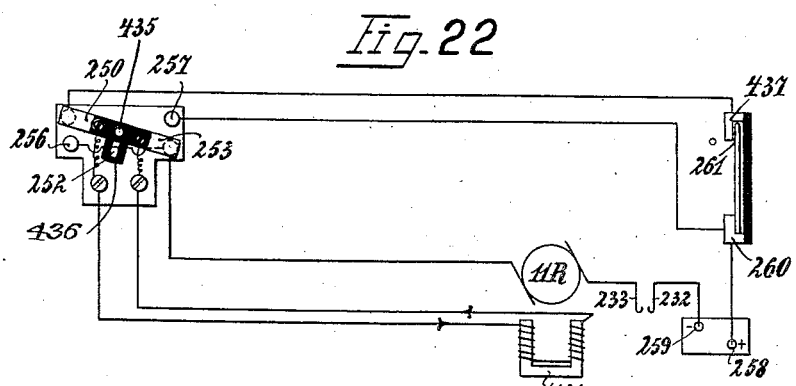

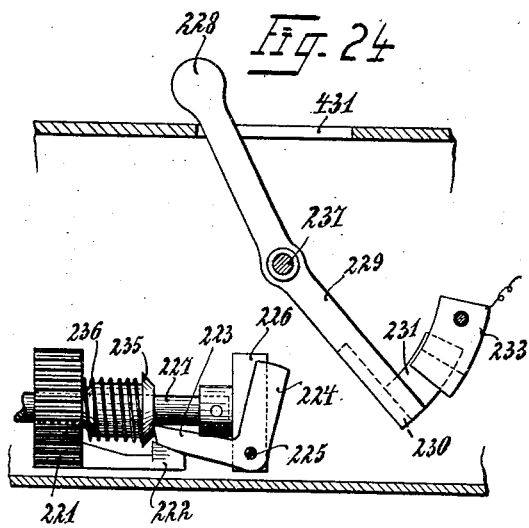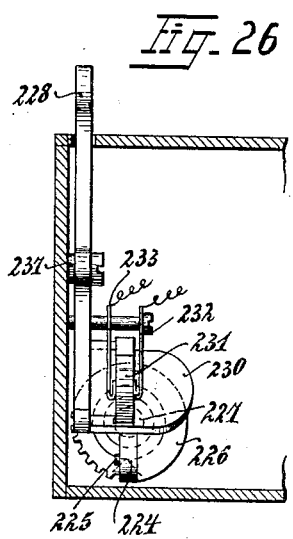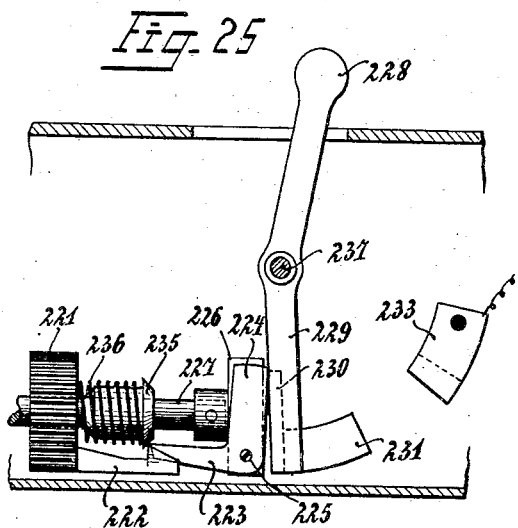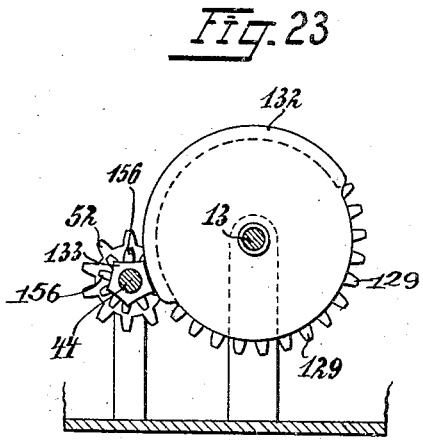

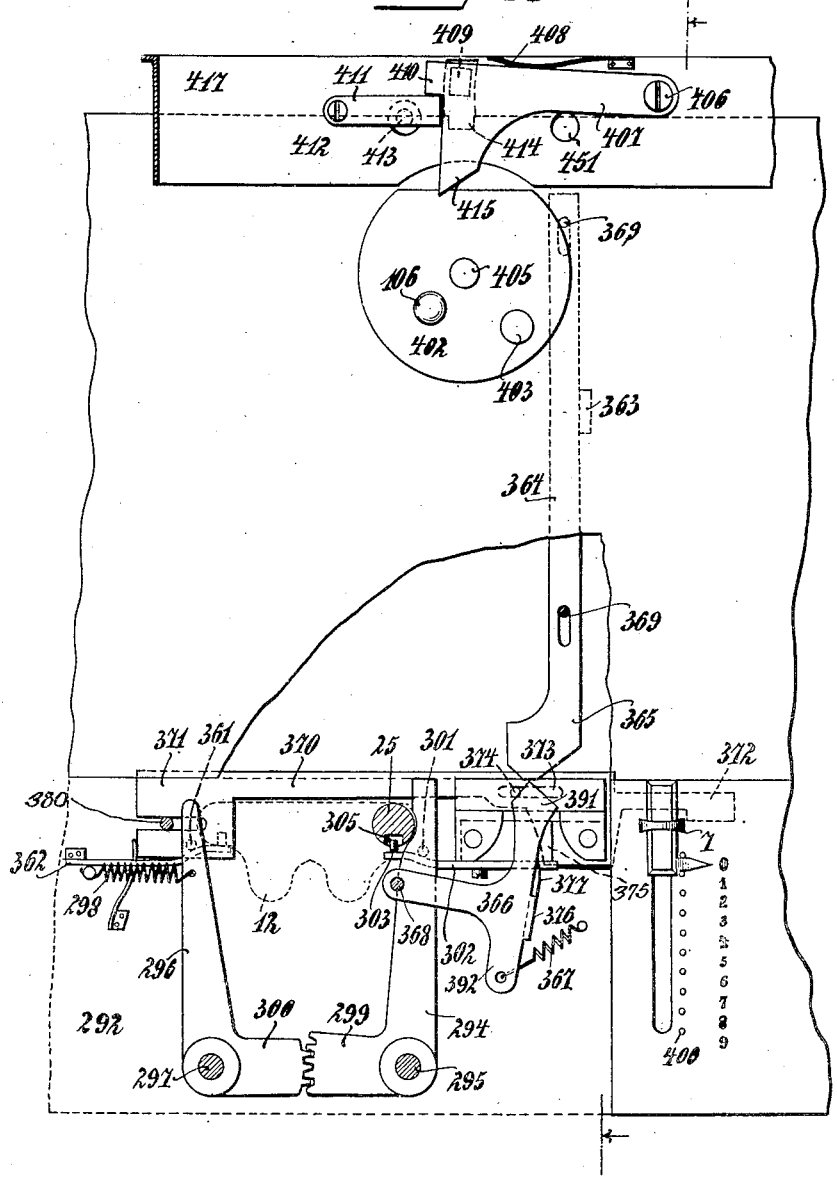

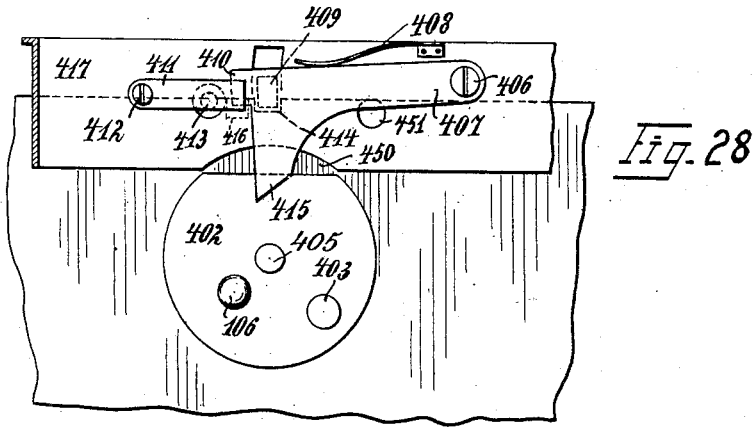

UNITED STATES PATENT OFFICE.

ALEXANDER RECHNITZER, OF BERLIN, GERMANY, ASSIGNOR TO AUTARIT-GESELLSCHAFT M. B. H., OF VIENNA, AUSTRIA.

CALCULATOR.

1,292,513. Specification of Letters Patent. Patented Jan. 28, 1919.

Application filed July 17, 1905, Serial No. 270,054. Renewed June 13, 1918. Serial No. 239,884.

*To all whom it may concern:*

Be it known that I, ALEXANDER RECHNITZER, a subject of the King of Hungary, and resident of No. 1 Bergmann Str., Berlin, Germany, have invented certain new and useful Improvements in Calculators, of which the following is a full, clear, and exact description.

The object of my present invention is to construct a calculator of the type shown and described in my U. S. Patent #809,075, dated January 2nd, 1906, which can be driven by a motor running continously during a calculation. To accomplish my purpose, I have provided new means which make it possible, that the driving motor, may run continuously during the regular course of the calculation, and have provided means which makes it impossible for the machine to come to a standstill in the course of a calculation in any way, for instance if the capacity of the machine should be overreached or through any other error of manipulations.

In the accompanying drawings,

Figure 1 is a plan view of the machine with a part of the top plate broken away;

Fig. 2 shows certain safety devices for the lever 25 in a sectional elevation along the line D—D of Fig. 1;

Fig. 3 is a detail of an adjusting pin 21;

Fig. 4 is a plan view of the machine with the top plates and the carriage removed;

Fig. 5 is a side elevation along the line C—C Fig. 4;

Fig. 6 is a side elevation along the line B—B Fig. 1;

Fig. 7 is a plan of the mechanism connected with the adjusting lever;

Fig. 8 is a detail of the mechanism connected with the adjusting lever 25;

Fig. 9 is a sectional detail view showing the connections of the main shaft 13 with the operating means;

Fig. 10 is a plan view of Fig. 9 and of the worms 29 and 30;

Fig. 11 and Fig. 12 are, respectively, side and front elevations of the worms and their operating means;

Figure 18:
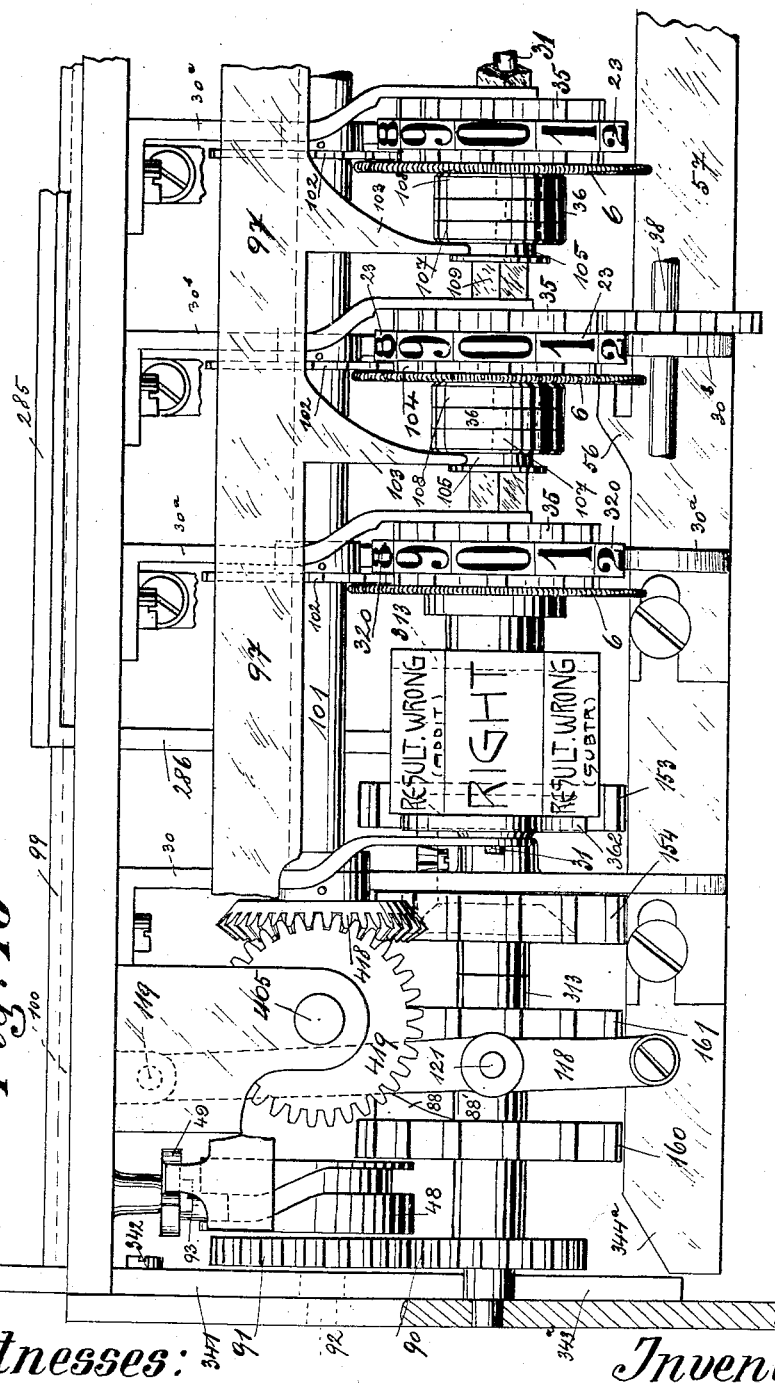
Figure 32:
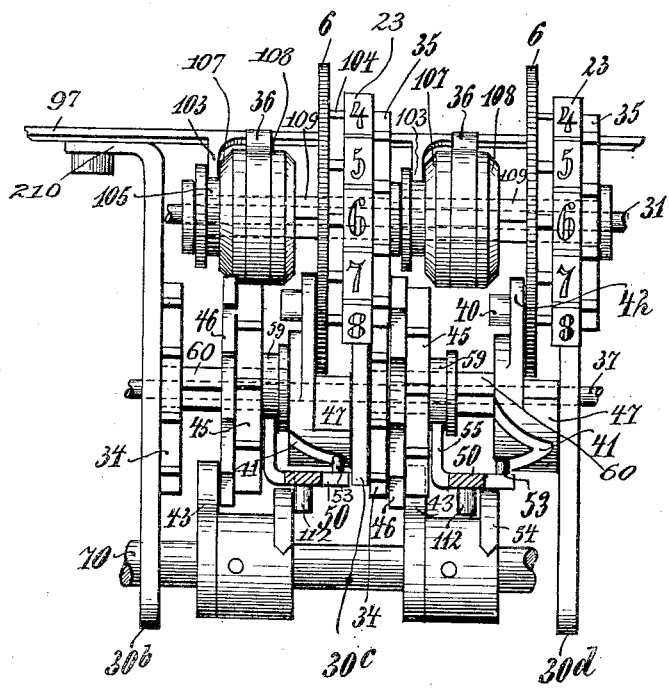
Figure 33:
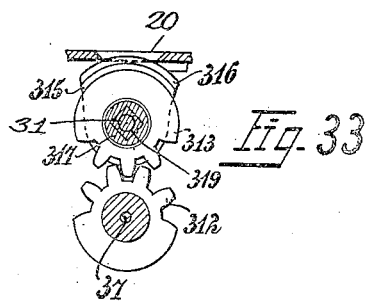

Figs. 13 and 13ª are side elevations along the line A—A of Fig. 1;

Fig. 14 is a detail plan view on line 13—13 Fig. 13;

Figs. 15 and 16 are cross sections through the registering and carrying mechanism of the carriage along the line E—E of Fig. 17;

Figs. 17 and 17ª show a front elevation of the carriage;

Figs. 18 and 18ª show a plan view of the carriage with the top plate removed;

Figs. 19 and 20 show details connected with the steering mechanism;

Fig. 21 shows the electrical motor connections during the actual calculating;

Fig. 22 shows the connections during the return of the carriage;

Fig. 23 is a detail view of the connection between axis 13 and axis 44;

Figs. 24 and 25 are front elevations;

Fig. 26 is a side elevation illustrating automatic disconnection of the motor from the machine under certain conditions;

Fig. 27 is a plan view of the mechanism shown in Fig. 2;

Figs. 28 to 30 show details of the mechanism of Fig. 27;

Fig. 31 is a detail in section of the gearing between gears 153 and 154;

Fig. 32 is an enlarged front elevation of the carrying mechanism as it would appear during the actual performing of a carrying from a lower to a higher digit;

Fig. 33 is a detail drawing of the warning shield;

Fig. 34 is a section through the warning shield and the mechanism connected with it; and Fig. 35 is a detail drawing of the yoke and the mechanism connected with it.

As shown in my hereinbefore mentioned patent, there appear through the top plates of my machine three different rows of devices by which figures can be set up; one row *a* (Figs. 1 and 13) is formed by the numeral wheels 320 and the numeral wheels 23, the numerals of which are visible through orifices 24. In this row figures can be caused to appear by turning hand-wheels 6 which extend through the top plate 2 of the carriage and are fastened to the above mentioned numeral wheels. The other row *b* is formed by the slots 26 in which buttons 27 can be moved to different points along the scale, from 0 to 9. The third row *c* is formed by the slots 5 and the buttons 7 sliding in the slots 5. The machine consists of a relatively stationary casing 1 (Fig. 1) and a movable carriage 2. The slots of row *c* are in the casing, the slots 26 and the orifices 24 are in the carriage.

An orifice 20 is provided on the left side of the carriage 1 (Figs. 1 and 17) at which, if the machine is in working order, no inscription at all will appear. If the capacity of the machine has been overreached, then a warning shield will appear below the orifice 20, with the inscription either "Wrong add" or "Wrong subtract." If such a shield has appeared it shows that the result obtained by the machine is wrong and that the machine is not in normal condition. The machine has to be put in normal condition again by the operator, who has to perform either additions or subtractions (according to which warning shield has appeared) until this warning shield disappears, whereupon further calculation may be done. Means are provided to prevent the machine even then coming to a standstill or being damaged, if the operator does not properly regard the warning shield and continues his calculations without regard to the same.

Means are provided to prevent the turning of the crank 106 (Figs. 1, 2, 28, 29, 30), unless the machine is at rest and other means prevent the starting of the machine if the crank 106 is not at rest. Other means prevent the starting of the machine for a new calculation, if the result of the previous calculation has not been canceled. Means are provided to prevent the numeral wheels 23 from being turned from 0 to 9 or 9 to 0 by the operator, which would erroneously cause a carrying in the next calculation.

The carriage is returned to its initial position automatically after the completion of each calculation.

The starting lever 25 is returned to its initial position, not only after the completion of an addition and subtraction, as has been done before, but either after a multiplication or after a division. On the other hand, the lever 25 cannot be moved during a multiplication or a division by the operator, which lever is moved automatically, after the completion of the calculation. The carriage 2 will usually tend to run to its utmost left-hand position during each multiplication and division, but for calculating with smaller figures, the movement of the carriage to the left may be limited by the operator to certain digits, by inserting the pin 21 (Fig. 3) into one of the holes 22 (Fig. 1).

*Operating mechanism.*

My preferred operating devices are mounted below and in contact with the buttons 7 of row $c$, and turn the registering wheels 23 to an extent indicated by the number set up in row $c$ (Figs. 1 and 13).

Rigidly secured to the main shaft 13, by one rotation of which, one addition or one subtraction is performed, is a segment 127 (Figs. 9, 10) which meshes with the gear 128 which is fastened to the shaft 122. The segment 127 has so many teeth that it turns the gear 128 once during each rotation of the main shaft 13, and thus causes the shaft 122 to be turned once. The shaft 122 is provided with a set of bevel gears 14 which are rigidly secured to it and which mesh with bevel gears 123. (Figs. 10 and 13$^a$). These bevel gears 123 are secured to shafts 124, which are rotatably mounted in the casing 1. On this shaft there are drums 3, one provided below each slot 5. Above the drums 3 are mounted a set of shafts 10, on which gears 9 are slidable, but turning with their square shafts 10. Such a gear 9 is slid forward and backward in its slot 5, on its shaft 10 by the button 7 carrying depending arms 125 which extend into the slot or groove 8 of the gear 9. On the drum 3 are gear teeth 4 cut in a certain well known manner, so that if the button 7 stands at 1, 2, 3 or 4, etc., of its scale, then the gear 9 is put to such a position above the drum 3, that 1, 2, 3 or 4, etc., of the drum will come into mesh with the gear 9 as often as the drum 3 is given one full turn. Thus it can be seen that each of the gears 9 will be turned to a certain extent dependent upon the position of its button 7 in its slot 5. The rotation of the shaft 10 is then transferred to the registering wheels 23 in the following manner if addition is performed. On the shaft 10 is the bevel gear 15 (Figs. 4, 10, 13) which turns a bevel gear 16, to which a gear 18 is secured. Gears 16 and 18 are freely rotatable on their shaft 126. The gear 18 transfers its movement to the gear 33 (Fig. 13) hereinafter described which is mounted on the carriage and turns a numeral wheel 23 by way of the gears 34 and 35 (Figs. 16 and 6). All these gears are cut in such a way that the numeral wheel 23 will be moved 1, 2 or 3, etc. units if the gear 9 is turned 1, 2 or 3, etc. teeth. A convenient arrangement, for instance, would be to provide gear 9 and bevel gear 15 with ten teeth, the bevel gear 16 and gear 18 with fourteen teeth, and have the three gears 33, 34 and 35 all provided with ten teeth.

If the figures set up in row $c$ are to be subtracted instead of added, the numeral wheels 320 and 23 must be operated in the opposite direction. For this purpose a second bevel gear 17 with the gear 19 (Figs. 4 and 10) is provided and in mesh at the right side of the bevel gear 15. The bevel gear 17 and gear 19 are therefore turned in an opposite direction to the gears 16 and 18. If, therefore, a figure is to be subtracted from the numeral wheels instead of added, the carriage must be shifted to such a position that the gears 33 will come in mesh with the gears 19 instead of with the gears 18. Thus my operating devices operate the registering wheels according to addition or subtraction, dependent upon the position of the carriage with regard to the casing, or, in other words, dependent upon the position of the registering devices with regard to the operating devices.

The carrying mechanism.

Upon each rotation of the main shaft 13, one addition or one subtraction is performed. Certain means must be actuated which perform the transfer of a unit from a lower to a higher digit, provided the lower numeral wheel passes from 9 to 0 or 0 to 9. The operating devices are operated during a part of a rotation of the main shaft 13, and after the operating devices have ceased to move the carrying mechanism is actuated. It is done in the following manner: A segment 129, (Figs. 4 and 23) rotates with the main shaft 13 and causes the gear 156 and the shaft 44, with all its gears 52, to turn a certain extent. These gears 52 are mounted on the shaft 44 in such a way that two of them will come in mesh with the gears 161 and 153 (Figs. 17 and 18) on the carriage if the carriage is in an adding position, at which time the gears 33 and 18 will be in mesh, in the position shown in Fig. 1, but if the carriage is in a subtracting position, i. e., when gears 33 mesh with the gears 19, then the gears 160 and 154 will be in mesh with two gears 52. The segments 129 and the gear 156, and the gears 52 and 153, 154, 160 and 161 will be cut in such a manner that, upon each rotation of the main shaft 13, the gears 153 and 161, or the gears 154 and 160, respectively, are turned once. A suitable arrangement would be to have the segment 129 provided with fourteen teeth, the gears 156 and 52 provided each with ten teeth, and the gears 153, 154, 160 and 161 provided with fourteen teeth. The carrying mechanism will be actuated through the driving means to be caused to perform properly a carrying, according to "addition" if the gears 161 and 153 are given one full turn, and will be caused to perform a carrying according to "subtraction" if the gears 154 and 160 are given one full turn.

Secured to the back plate of the carriage (Figs. 15, 16, 17 and 18) are bearings 30$^a$, 30$^b$, 30$^c$, etc., on which the carrying mechanism is mounted. The shaft 31 is mounted in these bearings 30 and carries the independently rotatable numeral wheels 23. Rigidly secured to the numeral wheels are the gears 35 which are in mesh with the gears 34 which are riveted to square shafts 60 (Fig. 32) and rotate with them on the shaft 37 so that the gears 34 can be driven by the gears 33 (Fig. 16). The gears 33 rotate freely on shaft 38 (Fig. 16) so that any operating devices as those described can turn the numeral wheel 23 in either direction by way of the gears 33 and 34. While the numeral wheels 23 are turned by the operating mechanism, the preparation for the carrying of the tens is performed in the following manner:

The wheel 45 with its safety wheel 46 (Figs. 17, 18$^a$ and 32) will be moved out of its (rest) position which is shown between the bearings 30$^b$ and 30$^c$ of Figs. 32 and 17 to the left into its active position as shown between the bearings 30$^c$ and 30$^d$ of Fig. 32, and between the bearings 30$^a$ and 30$^b$ of Fig. 17, by the following means: With each of the numeral wheels 23 there are rotatable single teeth 36 (Figs. 15, 17, 32). Each of these single teeth 36 mesh in the position shown in Fig. 17, with a single tooth 40 which is fastened to a segment 42. The segment 42 is secured to a small drum 47 which rotates but does not slide on shaft 37. Milled into the lower surface of this drum is an angle-shaped groove 41. A lever 50 pivoted on bearing 51 has its front end under the drum 47 and has on its right side a pin 53 (Figs. 17$^a$, 18$^a$, 32) which extends into the groove of the drum 47, and on its left side another pin or upward bent arm 55 which extends into the groove 59 of the gear 45 which rotates with the square shaft 60 on which it can slide. The shaft 60 rotates freely on shaft 37.

If a registering wheel 23 passes from zero to nine or nine to zero, its single tooth 36 will strike the tooth 40 and turn the groove drum 47 to the one or other side. The movement of the drum 47 will cause the pin 53 of the lever 50 to be pressed out of its normal position, which is in the middle of the groove 41, to the end of either one arm or the other of this groove 41, the pin 53 thus being moved to the left in Figs. 17, 18$^a$ and 32; therefore the lever 50 and through it the gear 45 is also moved to the left and reaches the position mentioned before as "active position", which is shown between bearings 30$^c$ and 30$^d$ of Fig. 32, 30$^a$ and 30$^c$ of Fig. 17 and at the left of bearings 30$^g$ and 30$^o$ in Fig. 18$^a$.

After the operating means have ceased to turn the registering wheels 23, the carrying of the tens which has been prepared as described, will be done if either the gears 153 and 161 are given a full turn as for "addition," or if the gears 154 and 160 are turned for "subtraction".

The following mechanisms are thereby actuated:

Each of the gears 153 and 154 have rigidly fastened bevel gears 61 and 62 which are in mesh with a third bevel gear 69 (Figs. 17 and 31) freely rotating on its bearing. The gear 154 with its bevel gear 61 is loosely rotatably mounted so as to be on shaft 120, the gear 153 with its bevel gear 62 is rotatable with and rigidly secured to shaft 70. Thus it will be seen that the shaft 70 must make a full turn either in one or the other direction; when for addition, the gears 161 and 153 are given a full turn, or, as for subtraction, the gears 160 and 154 are given one full turn.

On the shaft 70 are single teeth 43 fastened in such a position that one of them meshes with each of the gears 45, provided that gear 45 has been put to the left into the operative position shown between bearings 30$^c$ and 30$^d$ of Figs. 32 and 17. If the shaft 70 is rotated all gears 45 which are in active position will be turned one tooth and with them the square shafts 60 on which they slide. Rigidly secured to the left-hand end of each square shaft 60 are the gears 34 which are in mesh with the gear 35. The gear 35 is fastened to the numeral wheel 23 of the next higher order to that numeral wheel 23, which caused the respective gear 45 to move into active position. Thus the carrying of the tens from the lower the higher digits is performed.

Provision has been made so that the carrying is done properly if a registering wheel, in consequence of a carrying of the tens passes from zero to nine or from nine to zero as for instance if one is added to 999. At the same time that one of the gears 154 or 153 is rotated there is also rotated one of the gears 160 or 161. These gears are rotatably mounted on the shaft 120 (Figs. 6 and 17), and rigidly fastened together with the coupling boxes 88 and 89 and the gear 90, which latter gear meshes with the gear 91 (Figs. 6 and 18). Gear 91 is secured rigidly to the shaft 92 so that shaft 92 will always be turned once and in the same direction whether gear 160 or gear 161 is driven. Rotating with shaft 92 is a grooved drum 48 in the groove of which slides the pin 93, Figs. 17 and 18. The pin 93 is formed on the lever 49 which may be oscillated upon the bolt 94, to the right and left in accordance to the shape of the groove. The free arm of the lever 49 engages the slide bar 97, mounted slidably on tongues 210 (Figs. 17 and 32) on the bearings 30. The arms 103 of the bar 97 extend into the groove 105, of the single teeth disks 36, to which are secured the disks 107 and 108 all sliding together on the square shaft 109. The shafts 109 freely rotate on shaft 31 and are secured to the registering wheels 23. During the turning of the registering wheels 23 by the operating means, the teeth 36 are held in their normal position by the bar 97 as shown in Figs. 17 and 18. But before the turning of the gears 45 by the single teeth 43 the bar 97 will carry all the single teeth 36 to the left into a position which is shown in Fig. 32. In this position the single tooth 36 (Fig. 32) can mesh with the gear 45 directly, provided gear 45 has not previously been put to its active position as described before. And if a numeral wheel 23 should now pass from zero to nine or nine to zero during and in consequence of the carrying, then its single tooth 36 will be able immediately and directly to transfer a ten as necessary, to the higher numeral wheel, because the tooth 36 would now turn the wheel 45 one tooth which turns the higher numeral wheel 23 by way of the wheels 34 and 35.

If the gear 45 has been put into active position the tooth 36 will not mesh with it, as it is shown between the bearings 30$^c$ and 30$^d$ of Fig. 32. This will not cause any fault in working out a proper calculation as in each addition or subtraction a passing of a numeral wheel from zero to nine or nine to zero can occur once only and never will be made more than one full turn by one numeral wheel in one calculation, so that when a gear has once been moved to its active position by any tooth 36, then this tooth 36 cannot come again into a position to actuate anything in the same addition or subtraction.

I prefer to provide all parts of this carrying mechanism with safety devices to render the machine absolutely reliable and make the working of the carrying mechanism compulsory.

I term "compulsory" such mechanism the parts of which are not only brought positively to its respective position but are also positively prevented from being moved out of such a position through any accident caused by vibration, etc. unless they have properly to be moved.

The safety disk 107 on the left of the tooth 36 and the safety wheel 46 of the gear 45 make the movements of that gear 45 compulsory, if gear 45 is driven by tooth 36. The gear 45 must in such a case be in an inactive position described and shown between the bearings 30$^b$ and 30$^c$ in Fig. 32.

The disk segment 54, which is fastened on the shaft 70 secures the lever 50 and thereby the gear 45 either in its rest position or in its active position during the carrying of the tens. If the carrying mechanism is actuated the shaft 70 is turned and with it all the disk segments 54 which will either pass on the right or on the left side of a pin 112. Pin 112 is fastened to the lever 50. Thus the lever 50 is prevented from being moved out of its active or rest position, as the case may be, during the carrying of the tens.

The movements of the single teeth 43 which move the gear 45 if these gears are in active position are made compulsory in the following manner: On the shaft 92 (Figs. 16 and 17$^a$) which is always turned in the same direction, there are rigidly secured a number of cams 114, which are adapted to press upward in the levers 115, the front ends of which press against the safety wheels 46 and lock it, provided such a safety wheel is in its active position. Such position is shown between bearings 30ᵃ and 30ᵇ of Fig. 17, i. e., a position in which the gear wheel 45 will be turned by the single tooth 43. The cams 114 are shaped in such a way that the arms 115 are locking the safety wheels 46 before and after the turning of the wheel 45 by the tooth 43, so that the movement of the teeth 43 is made compulsory, too.

Another set of cams 113 is provided on axis 92. These cams press arms 117 upward, the front of which fits into the teeth of the gears 34 and locks them. The cams may lock the gears 34 before the carrying of the tens is performed, but their principal function is the following: If several or all numeral wheels 23 are at 999, etc. and one has been added, or they are at 000, etc. and one has been subtracted, then all gears are supposed in this carrying mechanism to be turned at once to 1000 or 999 respectively. Because during the carrying of the tens the tooth 36 of the lowest digit will directly turn its gear 45 (Fig. 32), these turn through gears 34 the next numeral wheel, 23, which turns through its single tooth 36 the next gear 45, which turns the next numeral wheel 23, and so forth. The play between the teeth of the gears must be corrected, as it would cause the said movement to disappear by and by. It is corrected by adjusting the gears 34 one after the other, and that is the main function of the arms 117, which, after the teeth 43 have passed the gear 34, are placed by their suitable shaped cams 113 into their gears 34, each one a little later than the next right hand lever 117, so that the movement begins from the right. Thus the numeral wheels 23 are adjusted one after the other and the movement will end at the left hand highest numeral wheel.

After that is done and after the carrying of the tens has actually been performed, all the gears 45, which had been put to active position, must be brought again to their rest position. This is done through a slide bar 57, (Figs. 15, 16, 17, 18) which is mounted in any suitable manner, for instance on the bearings 30, so that the slide bar may move to the right and left of Fig. 17. A lever 118 is pivoted on bearing 119 (Fig. 18) which is fastened to the back plate of the carriage. The front end of the lever 118 is fastened to the slide bar 57 so that the slide bar 57 can be moved by moving the lever 118. The lever 118 is pushed to the right after the carrying has been performed by an incline 88 of the drum 88′, which incline is adapted to press a pin 121 of the lever 118 to the right and thereby will press the lever 118 itself to the right together with the slide bar 57. The slide bar 57 has catches 56 (Figs. 17ᵃ and 18ᵃ) bent downward, which press the front ends of the levers 50 to the right and thereby cause them all together with the gears 45, and the grooved drums 47 to return to their initial positions. The teeth 36 too are brought back to their initial position by their slide bar 87 which is moved back to the right by the lever 49 in the course of the turning of the grooved drums 48 which moves the lever 49. The whole registering and carrying mechanism is thus in a normal position again and ready to register another addition or subtraction.

The transfer of the movements of the main shaft 13 to the shafts 122 and 44 can be made compulsory by safety wheels 130 and 131 (Figs. 9 and 10) and safety wheels 132 and 133 (Figs. 4 and 23). This transferring from the shaft 13 to shafts 122 and 44 is new as the drums 3 are now rotated during a part of each addition or subtraction only.

On all digits the operating means will complete the proper amount of rotation to be transferred by them to the registering wheels at the same moment, and in this moment the registering wheels ought to be locked positively at once in order to prevent them from turning farther then intended in consequence of their own inertia. The registering wheels may therefore be stopped by the cams 113, which may press their arms 117 against the gears 34, whereby gears 33 and the numeral wheel will be stopped, but it is preferable to have the stopping done directly from the main shaft 13 in the following way: Turning with the main shaft 13 are two cams 195 and 196 (Figs. 9 and 10). After the operating devices have ceased to move the cam 196 presses against an arm 198 which is rigidly secured to the axis 200. On this axis is a tooth 201 which meshes with the gear segment 202, which is rigidly secured to the axis 203. The axis 203 will therefore be moved in one or the other direction according to the movement of the axis 200. Now on axis 200 are fastened arms 204 on which a bar 205 is mounted which will be pressed between the teeth of the gears 18 and 19 as soon as the arm 198 is pressed back by its cam 196, whereby those gears are stopped, At the same time axis 203 will be moved accordingly. Fastened to this axis are the arms 206 (Figs. 10, 13 and 13ᵃ) on which a bar 207 is mounted. This bar fits between the teeth of gears 33 and is pressed against them by the aforesaid pressing of the cam 196 against the arm 198, and thereby these gears too are stopped. A spring 208 is provided in order to retain the bars 205 and 207 between the teeth of the gears after the excenter 196 has passed the arm 198 and especially while the main shaft is at rest. These bars also help to insure a smooth shifting of the carriage, for they hold the gears 18 and 19 as the gears 33 pass them when the carriage moves.

To insure the releasing of the gears 33 and 18 and 19 from the bars 205 and 207 the arm 197 may be secured to the axis 200 which would turn this axis opposite to the direction of turning by the arm 198 if the arm 197 is pressed down by its excenter 195.

On each rotation of the main shaft 13 the figures set up in row $c$ will once be added to or subtracted from some digits of the numeral wheels of row $a$. And whether the figures are added or subtracted can be determined by the position of the carriage with regard to the casing, or, in other words, by the position of the registering wheels with relation to the operating devices; and on the position of the carriage is dependent of course to what digit of the numeral wheels the figures will be added or subtracted.

*Mechanism for controlling the additions or subtractions. In multiplication and division.*

A mechanism is provided to control the number of rotations of the main shaft 13 during a multiplication and to count the number of subtractions during a division. It is mounted on the movable carriage below row $b$ (Figs. 1 and 13) and is connected with the buttons 27 of this row. Connected with the buttons 27 and sliding with them are racks 28. These racks are moved forward by the worm 29 or backward by the worm 30 in the following manner: Turning with the first left shaft 124 (Figs. 10, 11, 12, 13) of the drum 3 is the segment 311 which, if the drum is turned, turns gear 32 to which is fastened gear 135 which turns the gear 134, which is rigidly secured to the shaft 138 of the worm 29 and thus the worm 29 is turned once on each turning of the shaft 122, which shaft operates the operating device. The gear 136 is fastened to the shaft 138 which is in mesh with the gear 137. The gear 137 is rigidly secured to the shaft 139 (Figs. 10 and 12) and causes the shaft 139 and therefore the worm 30 to turn in opposite direction from worm 29. One set of worms only is provided in the machine, but these two worms are mounted in the casing, while the racks 28 are mounted on the movable carriage and thus by the movement of the carriage any one of them may be slit with the carriage over any one of the worms 29 and 30 to be driven by it. Thus dependent upon the position of the carriage any one of the racks, but never more than one, may come in connection with either one of the two worms. If the carriage is in an adding position during a rotation of the main shaft 13, then the worm 29 will be in mesh with some one of the racks 28 and will move the rack 28 during each addition one tooth toward the back of the machine, or, in other words, one of the buttons 27 which is connected with the respective racks 28 will be moved during each addition one step toward the position zero in the direction from 9 to 8, 7, 6 or its scale (Fig. 1). But if the carriage is in a subtracting position, then the worm 30 will be in mesh with any one of the racks 28 and therefore will move this respective rack 28 in opposite direction, *i. e.*, one of the buttons 27 will be moved during each subtraction from its position 0 toward 1, 2, 3, 4, etc. of its scale. Of course the more the carriage is moved to the left during a multiplication or division, the more left handed racks 28 will be moved, and therefore the racks or buttons 27 on which the additions or subtractions are controlled or registered will correspond to the order of the digit on which the additions or subtractions are performed in row $a$.

*The driving and steering mechanism.*

I prefer to use a machine with a continuous running motor such as an electric motor. During the performance of a calculation there must be in the preferred form of my machine two kinds of movements, one is the moving of the carriage, the other movement is the real calculating while the main shaft 13 is turned. I prefer not to allow these two movements to interfere one with the other, and to be able to use a continuously running motor, I provide two mechanisms. The one mechanism makes it possible that the power of the motor is transferred to the carriage as well as to the main shaft. The other mechanism prevents the movement of the main shaft and removes the power of the motor from it as long as the carriage is moving, and I also prevent a movement of the carriage as long as the main shaft is turning. An epicyclic gearing (Figs. 4 and 6) is provided the middle gear 142 of which is driven by the motor. It turns freely on its axis and has mounted therein a beveled gear 143 with which mesh two bevel gears which freely turn on the shaft. One of these bevel gears 144 is connected with the main shaft 13 and drives this shaft by way of the gears 145, 146 and 147. The other bevel gear 148 of the epicyclic gearing transfers the power to the carriage by way of the gears 149 and 157. Gear 157 is fastened to the shaft 158 with its bevel gear 162, which drives the bevel gear 163 (Figs. 13$^a$ and 4) which is fastened to the shaft 164. On the front end of this shaft 164 is rigidly secured a pinion 165 (Figs. 4 and 13) which meshes with the rack 166 in the back plate of the carriage (Fig. 17ª) so that the carriage will be moved forward or backward by the respective movements of the pinion 165, or, in other words, by the movements of the gear 149 of the epicyclic gear. The power of the motor will always be able to press upon the main shaft 13 as well as upon the carriage, provided of course, the motor is coupled with the gear 142.

Fast to the main shaft 13 is a drum 166ª (Figs. 4, 13 and 7) having a groove 167, in which is located the pin 168 of the lever 169. The lever 169 (Figs. 4 and 13, and 7) is pivoted to the bottom of the casing at 170. It has on its upper arm 171 a pin 172 (Figs. 13 and 5). This pin is made to fit into holes 173 in the back plate of the carriage 2 (Figs. 13 and 17). The groove 167 is shaped in such a way that if the main shaft is in a rest position the pin 172 of the lever 169 will be kept outside of the back plate of the carriage 2, but as soon as the main shaft has commenced to turn, the groove 167 will move the lever 169 to the right of Fig. 4 and thereby bring the pin 172 into one of the holes 173 of the back plate of the carriage 2 so that the carriage is prevented from movement during any movement of the main shaft. To direct whether in any moment the shaft or the carriage shall move, the following mechanism is provided: Connected with the axis 66 of the yoke 65 (Figs. 6, 13, 15, 16, 17 and 35) and sliding with this yoke is an arm 179 (Figs. 16 and 35) which extends through a hole in the back plate of the carriage to the outer side of the back plate. To the end of this arm 179 is secured a thin plate 100 which may be slid to the right and left if the yoke 65 with its axis should slide in its bearing. Covering the plate 100 is another thin plate 99, which is screwed to the carriage so that really the plate 100 will slide between the back plate of the carriage and the covering plate 99. Holes 98 are drilled through the plates 99 and 100 and the back plate of the carriage similar to the holes 173. The holes 98 are drilled in such a way through the three plates that they may all fit together and form one long hole if the plate 100 is pressed backward to the right of Fig. 35 by the yoke 65 against its spring 68. This will happen if during a movement of the carriage the yoke 65 will be caught by one of the pins 63 or 64 (Figs. 4 and 13). Then the carriage will move a little farther to the left and thereby move the yoke 65 against the pressure of a spring 68 toward its bearing 67, whereupon—this movement being limited—the whole carriage will have to stop. But if the yoke 65 is not caught by one of the pins 63 or 64 and is free to move, the entrance to the hole 98 of the back plate will be closed by the forward movement of the plate 100 in consequence of the tension of the spring 68, so that a pin could not enter the holes 98 as shown in Fig. 35. To prevent turning of the main shaft as the carriage is moving, I connect such a pin with the main shaft, which pin must enter the holes 98 when a rotation of the main shaft begins. There is no need to provide such a pin to enter the holes 98 in any other position as the carriage can only move in this moment, being retained in its position during a rotation of axis 13 by the pin 172 as described before. One form of this construction is shown in Figs. 19, 20. On the main shaft 13 is a disk 182 with a groove 183 on its side, into which extends a pin 184 of an arm 185 which can be slid in its bearing and moves by its forward or backward movement a lever 189 which is secured to the bottom of the casing on its screw 191. The other arm of the lever 189 carries the pin 192 which can enter the holes 98 if the lever 189 is put forward. The groove 184 is shaped in such a way that it presses the arm 185 forward just at the beginning of a rotation of the main shaft so that then the pin will try to enter one of the holes 98 and if the holes are closed it will stop the main shaft.

A second form of such a construction is shown connected directly with the arm 169 in Figs. 5, 13. The arm 169 is moved from the right to the left of Fig. 4 by the groove 168 as described before just at the beginning of each rotation of the main shaft 13, and this being the moment, when a pin ought to enter one of the holes 98 the two movements may be connected, for instance, in the following manner: Secured to the bottom of the casing is a two-armed lever 194 (Figs. 4 and 5), one arm of which is rotatably screwed to and moved by the arm 171 of the lever 169, while the other arm of the lever 194 transfers this movement to an arm 95 rotatable around its bearing 95′ and having a pin 96 fastened thereon so that the pin 96 can enter one of the holes 98. It is clear that in consequence of this arrangement, pin 96 will try to enter the holes 98 when the pin 172 of the lever 169 is moved out of its hole, and of course if the holes 98 are closed, the arm 169 cannot perform its movement to the left in the groove 168, whereby the main shaft will be stopped. Thus I can prevent (by one of the two mechanisms described) a simultaneous movement of the carriage and the main shaft.

As heretofore described, the gear 142 was driven forward by the motor in the direction indicated by arrows in Fig. 6. To return the carriage again to its initial position the motor may be made to drive the gear 142 backward. Preferably the main shaft 13 will be in its rest position when the backward movement is performed, and will be prevented from being moved backward; thus the carriage only being free to be moved. For this purpose a pin 265 (Figs. 6 and 7) may be fastened to the drum 166 against which an arm 266 is pressed by a spring 267. This arm has its bearing on the bottom of the casing and will be pressed just below the pin 265 of the main shaft by in its rest position, so that the main shaft 13 cannot be turned backward from this position, while of course any forward movement cannot be obstructed by the arm 266 which would be pressed backward during such a movement by the pin 265. The pin 265 has simply the function of a ratchet wheel.

On the other hand, the carriage will be free to be moved backward during any rest position of the main shaft 13, as the catches 63 and 64 have inclines (Figs. 5 and 6) which prevent the yoke 65 from catching itself on any of them in going backward to the right of Fig. 5. And therefore the carriage will be moved backward if the gear 142 is being moved backward.

*Motor and electrical connections.*

I prefer to have my machine driven by an electro-motor 11, which may be mounted inside the casing 1 (Fig. 4) and will run continuously in one direction from the beginning to the completion of a calculation. Then after the completion of the calculation, the motor will be reversed and thus drive the gear 142 in the opposite direction to return the carriage to its initial position, whereupon the electric current will be interrupted and the motor stopped.

The motor (Fig. 4) may be coupled to the epicyclic gear 142 in the following manner: To the shaft of the motor is fastened a pinion 220, which drives gear 116 and in turn the gear 221, which is loosely rotating on shaft 227 (Figs. 24, 25, 26). A pin 222 is fastened to this gear, which can drive through a pin 223 the disk segment 226 (Fig. 25) on which the pin 223 is rotatably pivoted at 225. Segment 226 is rigidly secured to the shaft 227, to the other end of which (Figs. 4 and 6) is secured the pinion 234 which drives the epicyclic gearing 142. The pin 223 can transfer the power of the motor to the shaft 227, thereby to the machine up to a certain limit only, which can be determined by the tension of the spring 236. The front end of the pin 222 is beveled and therefore would tend to press the pin 223 from the position shown in Fig. 25 to the position shown in Fig. 24. The spring 236 would tend to prevent such a movement by pressing the beveled ring 235 against the pin 223. Now the spring 236 will be relatively strong, so that the motor will be able to drive the machine in the course of the regular calculating. But should any accident occur and the machine come to a standstill, the motor will be disconnected from the machine as the arm 223 will be pressed against the bevel 235 as shown in Fig. 24 to disconect the pin 222 frim the pin 223 and therefore the motor could not do any damage to the machine.

If the motor is thus disconnected from the machine, the current can be interrupted by moving the lever 228 to the right of Fig. 1. This lever is fastened with a screw 237 to the casing 1, extends with its handle through the top plate of the casing, and can be oscillated by hand in its slot 431. If the lever is at the left, as shown in Fig. 24, the circuit will be closed. If the lever is pressed to the right, then the brass arm 231 will be moved out of the contact 232 and 233 and interrupt the current which drives the electric motor, as will be demonstrated later. After the cause of the obstruction, which caused the disconnection of the motor from the machine has been removed, the motor can be coupled again to the machine if the lever 228 is pressed entirely to the right into the position shown in Fig. 25. Then the disk 230 which is bent to the lower arm 229 of the lever 228 will press against the arm 224 of the pin 223 and thereby will bring it back again into the normal position shown in Fig. 25. The lever 228 must then be put into the position shown in Fig. 24 in order that the circuit may be closed again and the machine continues its calculation.

Now with regard to the starting of the motor and the electrical connections, I prefer to make them in such a way that the motor may be started forward if the lever 25 be moved out of its rest position and the motor will continue its forward movement until the calculation is completed and the lever 25 returned to its rest position. Then the motor must be reversed and now rotates backward until the carriage is returned to its initial position. My preferred form of these constructions is the following: If the lever 25 (Figs. 6, 7 and 8) is moved to any starting position in the slot 12, then it will be moved, as will be more particularly described later, out of reach of the bar 242 of the reversing lever 240. This reversing lever 240 is normally pressed down against the catch 77 of the disk 78 as it can turn around the bearing 243 with which it is mounted to the disk 78. The one end 241 of the reversing lever is left thicker, so that it can be pressed down into the position shown in Fig. 8 by the beveled end 245 of a sleeve 246, which can slide on the main shaft 13, and is pressed against the disk 78 by a spring 248. On the other hand, if the bar 240 is pressed down around its bearing 243, then the beveled sleeve 246 will be pushed back on the main shaft against the spring 248 into the position shown in Fig. 7. Thus the pressing down or the releasing of the reversing lever will cause either a short forward or a backward sliding of the ring 246. Secured to this ring 246 is a ring 247 which bears a pin 251 which extends downward into the slot 252 of the arm 436 of a pole changer, which arm 436 can turn on its bearing 435 (Figs. 21, 22). The pole changer is adapted to change the poles of the magnet of the motor and will be put to the one or the other position through the movement of the pin 251 of the beveled ring 245. Fig. 21 shows the electrical connections if the reversing lever 240 is released and the motor rotating forward as during the performance of a calculation. Fig. 22 shows the connections if the reversing lever 240 is pressed down and the motor rotating backward to draw the carriage back into its initial position. If the carriage then reaches its initial position the current will be interrupted by a pin 430 (Fig. 1) which is fastened to the top plate of the carriage 2 extending downward. If the carriage is in its initial position, then this pin 430 will press against the spring 261 (Figs. 21 and 22) of an interrupting contact, whereby the current will be interrupted, but only for the backward movement of the motor, as will be clear from Fig. 22. But the current will not be interrupted for a forward movement of the motor, as for such movement the current does not pass at all through the interrupting contact 261 as will be clear from Fig. 21. In Figs. 21 and 22 the numbers 258 and 259 denote the entrance for the positive or negative current, respectively, 232 and 233 the contact connected with the mechanism of the lever 228 (Fig. 24), 11M the magnet, 11R the rotating part of the motor, and the numbers 250 to 257 the different poles of a well known pole changer. Now it must be remembered from this section of the specification that the motor will start forward if the starting lever 240 is released. If the starting lever is pressed down, the motor will rotate backward until the carriage will again reach its initial position.

Subtraction.

For performing subtraction the minuend is set up in a row $a$ which may be done by turning the hand wheel 6 of the numeral wheels 23. The subtrahend is set up in the slots 5 of row $c$ and the lever 25 is moved to subtraction. The lever 25 oscillates on the axis 190 which can slide to the right and left in its two bearings 272 (Figs. 4, 7, and 6). I have mentioned, in the foregoing chapter, that the carriage will always start for any calculation from its initial position. Now this initial position is in the present form of my machine the furthermost right-hand position to which the carriage can be moved, and not the first adding position as has been the case in the machine described in my U. S. Patent #809,075.

Now if the lever 25 is moved into the position marked "Subtraction", then through the backward movement of the lever 25 its arm 76 will be moved out of the reach of the reversing lever 242, and, as explained, the electric motor is started forward. The motor therefore commences to drive the epicyclic gearing forward, and either the carriage is moved to the left or the main shaft is turned. Now if the carriage is in its furthermost right-hand initial position, the yoke 65 is not fastened to any pin 64 or 63 but will just stand with its one arm above the first pin 270 (Fig. 5) and therefore the yoke must always be in position shown in Fig. 6 because the yoke would be turned and elevated into such a position (if the carriage reached its initial position) by the inclined surface of the pin 270 (Figs. 4 and 5). Therefore in the initial position of the carriage the yoke will be free and in a position to be able to engage the first subtracting pin 63; therefore the carriage 2 will be moved to the left until to the first subtracting position, in which it will be stopped through the yoke 65, if the yoke catches the first subtracting pin 63. All the pins 64 are fastened in such a position in the casing that the carriage will stop in an adding position, as shown in Fig. 4. If the yoke 65 catches one of the pins 64, then the gear 33 of the carriage will mesh (as can be seen under that part in Fig. 1 in which the top plate is broken away) with the adding gears 18 of the operating means, but if the machine is subtracting, then the carriage 4 will be fastened still more to the right of the position shown in Fig. 1 so that the gear 33 will be in mesh with one of the subtracting gears 19.

Thus, if the lever 25 be moved to subtraction the carriage will start moving to the left to its first subtracting position when the main shaft will commence to turn. But the main shaft can be turned once only, as before the end of this turning the lever 25 will be put back to its rest position. This is done by an incline 176 (Fig. 8), which catches the arm 76 on its incline 244 and draws the arm with the lever 25 back to its initial position so that it will press against the catch 77 whereby the reversing lever 240 will again be pressed down and the main shaft stopped.

The pressing down of the reversing lever 240 causes the motor to be reversed. The carriage is therefore brought back after one revolution of the main shaft to its initial position by the now reversely rotating motor, and, as shown before, the carriage will interrupt the electric current as soon as it reaches the initial position. The subtraction will thus be performed.

As in performing a subtraction the movement of the worms 29 and 30 are not necessary, they can be put out of operation by the following means: Secured to the bottom of the casing with the screw 273 as a pivot (Fig. 4) is a lever 230, the front end of which is forked and straddles the lever 25 (Fig. 7) so that the lever 230 is moved, if the lever 25 is put in its slot to the positions "subtraction" or "addition." Fastened to this lever 230 is a pin 274 which is adapted to move the grooved ring 275 (Figs. 11 and 12). Fastened to this ring are the parts 180, 275' and 31 which are all turning with the axis 124 but slidable on it. If the gear segment 31' is slid backward on the axis 124, it will get out of mesh with the gear 32 and cease to turn it. If the segment 31' is in an active position, its movement of the gear 32 can be made compulsory by means of safety wheels 276 and 180. If the wheel 31 is drawn out of mesh with the gear 32 the full disk 275' will come in mesh with the safety wheel 276 and thus lock it. Thus the worm 29 and 30 will be out of action and locked during a subtraction or during an addition in consequence of the backward movement of the lever 25.

In setting up the minuend a movement of the levers 50 (Fig. 18ᵃ) to the left may be caused accidentally by a movement of a numeral wheel from 0 to 9 or 9 to 0 as explained in describing the carrying mechanism. Through such a movement an unjustified carrying from a lower to a higher wheel may happen in the next calculation. To prevent that, I mount an incline 340 (Figs. 4 and 6) on the casing which can press against a bar 341 which is mounted with the screw 342 on the left-hand side plate of the carriage (Figs. 17 and 18). Inclined 340 will press against the bar 341 when the carriage reaches its furthermost left hand position, i. e., when the carriage is at rest and the machine is at rest, which will of course always be the case if figures are set up by the operator. Then the bar 342 will be pressed into the position shown in Fig. 6 by the incline 340, whereby the front end 343ᵃ of the bar will lie before the end 344ᵃ of the bar 57 and thus will prevent a movement of the bar 57 (Figs. 6 and 7) to the right, whereby all the levers 50 will also be locked in their proper position. And thus the numeral wheels 23 are prevented from being turned from 0 to 9 or 9 to 0 if the machine is at rest.

If the minuend should be smaller than the subtrehend, for instance, if one should try to subtract 8 from 6, then the machine could not give a right result, as of course its capacity would be overreached. In this case the warning shield "result wrong add" will appear below the orifice 20 (Figs. 1, 17, 34). If the first left-hand numeral wheel 320 passes from 0 to 9, which must happen if more has been subtracted from the numeral wheels than has been indicated on them, its single tooth 310 (Figs. 13, 17 and 34) turns a segment 331 to which a gear segment 312 is fastened (Figs. 17, 33 and 34) which turns the gear segment 313 (Figs. 33 and 34) which is fastened to the disk 315 and turns with it. The disk 315 bears the two warning shields which therefore will be turned by it to appear below the orifices 20. If too much has been subtracted, then the warning shield will appear: "Result wrong add," in order to indicate that new additions shall be performed until the warning shield disappears again.

The gear segment 313 is fastened to the disk 315 directly (Fig. 34). Through the large center hole of the segment 313 passes a ring 317 (Fig. 34) which is pressed with its tooth 310 by the spring 318 (Fig. 17). The tooth 310 is mounted on a square shaft 319 so that it turns with the first left-hand numeral wheel 320 to which the square shaft 319 is fastened, on which shaft 319 the tooth 310 can slide. The purpose of this construction is to prevent the machine from coming to a standstill even if the operator does not properly regard the warning shield and continues to subtract, for then the tooth 310 will pass again the segment 311 which could not move any more, because the safety wheel segment 321 is cut in such a way as to prevent a further movement of the segment 311 to which it is fastened. Now therefore, small inclines 322 (Figs. 13 and 34) are filed on the outer side of the segment 311 so that if the tooth 310 would try to turn it still further away from its correct middle position, then the tooth 310 would simply slide over the incline 322 and will then be pressed again against the numeral disk by the springs 318. Thus it will be seen that all necessary means are provided to prevent the machine from coming to a standstill while subtracting.

*Addition.*

For performing an addition one sum is set up in row *a*, the other sum is set up in row *c* and the lever 25 is moved in its slot to the position marked "addition." As it will be observed, the adding position of the lever 25 is somewhat to the right of the subtracting position. It has a pin 192 extending downward, which pin engages a slot 193 of a lever or grooved plate 84 (Figs. 4, 6 and 7). If the lever 25 is moved to the right the arm 84 will be moved with it. On the front portion of the arm 84 is a groove 83 into which a pin 281 extends (Fig. 7). This pin 281 is fastened to the arm 87 of a bar 82. The groove 83 is shaped in such a way, that it pushes the pin 281 and the arm 87 with the bar 82 forward if the lever 25 is moved from a position opposite "subtraction" to "addition." By this forward movement of the bar 82 small inclines 81 are placed in front of the pins 63 which renders the pins 63 inactive (Figs. 4 and 13). The pins 63 are thus not able to catch the yoke 65, as the yoke 65 will slide over the inclined surface 81 whereby a catching of the yoke with the pins 63 will be prevented. As has been described in the chapter "Subtraction," by the backward movement of the lever 25 and the arm 76, the reversing lever 240 will be released to start the motor forward which pushes first the carriage forward. Now the carriage cannot stop at the first subtracting position, i. e., at the pin 63 but will slide over the pin 63 and thereby the yoke 65 will be turned into a position to catch the first adding pin 64 as shown in Fig. 13. The carriage therefore will not be locked until it reaches the first adding position whereupon the main shaft will perform one rotation and then be stopped, as again the lever 25 will be drawn back to its initial position before the completion of the one rotation by the inclines 244 and 176 and will again lie against the catch 77 by pressing the reversing lever 240 against it. By the pressing down of this reversing lever the motor is again reversed, thereby the carriage will be drawn back to its initial position, where the current will be interrupted and the motor stopped in the same manner as described in "subtraction."

If so much has been added to the numeral wheels that the capacity of the machine has been overreached, and the first left-hand wheel 320 has passed from 9 to 0, then a warning shield will appear again, and as the tooth 310 will actuate this time the mechanism already described in the chapter "subtraction" to the opposite side, now the opposite shield "Result wrong subtract" will appear and be visible in the orifice, 20. The operator then performs subtraction until the shield disappears by the backward turning of the first left-hand numeral wheel 320. But if he does not regard the warning shield properly, the same mechanism described heretofore and connected with the spring 318 (Fig. 17) will prevent the machine coming to a standstill.

*Multiplication.*

My machine performs multiplications after the well known principle of adding the multiplicand as often on each digit of the registering wheels as the multiplier indicates. A multiplication is performed on my present machine if the multiplicand is set up in row c, the multiplier in row b and the lever 25 is moved in its slot to the position marked "Multiplication", therefore the machine will have to add the multiplicand set up in row c as often to each digit of the numeral wheels as this button 27 indicates which corresponds to the respective digit of the numeral wheels, and on which the multiplier has been set up. As before described lever 25 is put to its position "multiplication" and the lever 25 will be locked in this position by the pin 303 of the springs 302, Fig. 27; for which purpose the pin 303 will snap into the hole 305 of the lever 25. This position of the lever 25 is somewhat to the right of its adding position, so that the lever 25 must be moved still more to the right in "multiplication" than had to be done in "addition" (Fig. 1). All the catches 63 will remain made inactive by the inclines 81 which remain lying before them as in addition, but by the further movement to the right of the lever 25 the multiplication pin 74 (Figs. 6 and 7) is swung around its bearings 71 forward against the carriage into an active position. This is done through the levers 86 and 80. The lever 86 is pivoted to the bottom of the casing by a screw 282, Fig. 7. One arm of the lever has a pin 80' which slides in the groove 79 which is milled into the grooved arm 84. The groove 79 is shaped in such a way that if the arm 84 is pushed to its utmost right-hand position by moving the lever 25 to multiplication, that is, entirely to the right, the pin 80' with its lever 283 is pushed forward against the back of the casing whereby the other arm of the lever 86 will be moved backward and will draw the arm 80 against the front of the casing, whereby the pin 74 (Fig. 6) is also put forward. Attention is drawn to the fact that by moving the lever to multiplication, the segment 31' (Fig. 13ª) will not be moved out of active position and therefore in multiplication the worms 29 and 30 will be at work. This is the adjustment of the interior of the machine if it starts for multiplication. By the movement of the lever 25 to the right to "multiplication" its arm 76 is brought out of reach of the reversing lever 240 which therefore will be released, whereby the motor starts forward. Thus the carriage is started forward to its first adding position, where the machine would commence to add and as no means will turn the lever 25 to its initial position from "multiplication" as from "addition" and "subtraction", after a certain number of rotations of the main shaft, the machine would, as far as described, continue to add indefinitely. Now the number of additions are regulated on each digit in accordance with the number set up as multiplier in row b in the following manner:

The worm 29 is actuated during multiplication and will be turned once on each rotation of the main shaft, that is, upon each single addition performed. Each rotation of the worm 29 moves the rack 28, one step toward the back of the machine and with it the buttons 27 upon each addition one number from the position to which they have been put by setting up the multiplier, back to its zero position. For instance, if the button 27 would have been put by the operator to 3 it would need three additions to return it to its zero position. Now means are provided to stop the additions in each position of the carriage if the button 27, the rack 28 of which happens to be in mesh with the worm 29, reached again its zero position. These devices are the following:

Opposite the worm 29 and therefore just opposite the rack 28 which happens to be in mesh with the worm 29, is the movable pin 74 mounted in the casing. I may use the slotted pin 74 which is bent on its lower end 73 to receive a pin 284 (Fig. 6), which is connected with the arm 80 so that the pin 284 draws the pin 74 forward into its active position upon putting the lever 25 into its position "Multiplication." If the rack which is in mesh with the worm 29 reaches the zero position, it presses the pin 74 on its inclined surface of the head of the pin 285 down, whereby the yoke 65, as will presently be described, will be moved out of mesh with the pins 64 and swung over into a position to catch a pin 63, but as these pins are made inactive, the yoke 65 would be put back by the inclines 81 into a position to catch again a pin 64. Thus in the moment in which a rack 28 reached its zero position, the additions would be stopped on this digit and the carriage moved to the left to engage the next adding pin 64 and additions will be commenced thereby on the next lower digit, whereby the next lower rack 28 will come in mesh with the worm 29 and will be brought back by continuous addition to its zero position, and now stop the additions on this digit and then move the carriage and thus the multiplication is continued and completed.

The mechanism by which the pin 74 swings the yoke 65 out of the adding to the subtracting position is the following: The pin 74 has a pin 75 fastened to its surface, which, if the pin 74 is in active position and pressed down, will press down on its part a bar 285 which bar 285 is mounted on two levers 286 (Figs. 6, 15 and 18). These levers are pivoted on axis 70 and the one arm 287 of the lever 286 is adapted to press down the yoke 65 out of its adding into its subtracting position shown in Fig. 6, either by pressing the yoke 65 directly as shown in Fig. 6, or by pressing down another suitably shaped part 288 (Fig. 15) fastened to the axis 66 of the yoke.

Means must be provided to stop the machine after the performance of a multiplication, consisting of a pin 290 fastened on the top plate of the carriage, 2, Fig. 1, in such a manner that if the carriage is reaching its end position after the end of the calculation, multiplication or division, then the pin 290 will put the sliding bar 291 (Figs. 1 and 2) to the left. The bar 291 is mounted below the plate 292 in any suitable manner such as on a bearing 293, and if it is moved to the left by the pin 290, it presses the arm 294 to the left. The arm 294 is mounted below the plate 292 and oscillates on its screw 295. If it is moved to the left, it releases the lever 25 from locking through the pin 303 (Fig. 27) as the lever 294 would press backward the spring 302 by a pin 301, which is fastened to the lever 294. Then the lever 25 is by the farthest movement of arm 294 pushed out of the multiplication position back into the middle of slot 12, i. e., its rest position. Now, if the carriage is moving, as is the case if the lever 25 is returned in this way, then the main shaft must be in a rest position, and if therefore the lever 25 is put back to its rest position in such a moment, its arm 76 must be put above the reversing lever 240. For this purpose, the arm 244 of the lever 25 has on its front part small inclines and the reversing lever 240 has also small inclines on the side of its end 242. This enables the reversing lever to be pressed down by a sideward movement of the lever 25, whereby the arm 76 of the lever 25 is pressed above the reversing lever 240. As it is known already, by the pressing down of the reversing lever, the motor is bound to bring back the carriage to its rest position, as explained in addition and subtraction, and the whole mechanism is stopped and the electric current is interrupted as soon as the carriage again reaches its initial position.

If a multiplication with a small multiplier shall be performed, a pin 21, Fig. 3, may be inserted at choice into any of the holes 22 in the top plate of the carriage. Then this pin 21 will take the place of the pin 290 and will move the bar 291, thereby causing the stopping of the multiplication and the return of the carriage and the lever 25 to its rest position. Of course the farther to the left the pin 21 will be inserted by the operator, the shorter will be the movement of the carriage. This pin can be used in division too, if a small quotient only is wanted.

It is advisable to commence with adjusting the multiplier, not with the highest, most left-hand button 27 in order that the capacity of the machine may not be overreached, but even if that would be the case, the machine would not come to a standstill in consequence of the mechanism connected with the warning shield and the spring 318 (Fig. 17) which has been described in the chapter "Subtraction."

Thus it will be seen, that all means are provided to prevent the machine to come to a standstill during a multiplication.

*Division.*

For performing division the dividend is set up below the orifices of row *a*, the divisor is set up in row *c* and the lever 25 is moved to "Division." I prefer to perform divisions after the same principle as shown in my before-mentioned patent, that is, the divisor set up in row *c* is subtracted successively from each digit of the dividend, so that the numbers of subtractions on each digit form the quotient. The number of subtractions or the quotient will be registered or counted properly in row *c* by the buttons 27 being moved automatically to show the result. Through the movement of the lever 25, to Division, the reversing lever 240 will be released, whereby the motor is started forward and the carriage drawn to the left and stopped in the same way as described in subtraction on the first subtracting pin 63 so that the machine would commence to perform subtractions. This is because the movement of the lever 25 to "Division" moves the arm 84 with its different grooves milled thereon to a position to the left, whereby the machine will be adjusted in the same way as described for subtraction, with the adding pins 64, as well as the subtracting pins 63 active, the bar 82 with its inclines 81 being withdrawn from the pins 63. The difference from the adjustment for subtraction is only that the lever 25 is not moved back after one rotation of the main shaft to its rest position again, but that the main shaft is in the same manner as in multiplication free to turn indefinitely. The rotations of the main shaft must therefore be regulated by the following mechanism:

The machine will continue subtraction and thereby subtract the divisor from the dividend and it will continue these subtractions until it has made one subtraction more than it should make, so that the machine will move the first left-hand numeral wheel 320 (Fig. 17) which will pass from zero to nine. Through this movement the yoke 65 will be turned out of the subtracting pins 63 to the adding pin 64, whereby addition shall be caused, through which addition the mistake made before will be corrected, so that the first left-hand numeral wheel 320 must pass again from nine to zero, whereby now a reverse movement of the yoke out of the adding pin 64 into the subtracting pins 63 shall be caused.

The mechanism for moving the yoke 65 consists of the first left-hand numeral wheel 320 having the single tooth 310 (Figs. 13 and 34) which is adapted to turn the segment 311. The movement of the single tooth and the segment 311 are made compulsory by the safety disks 321 and 346. The segment 311 is fastened to a drum 342 which is rotatably mounted on the axis 37. The lower part of the drum 342 has an incline 343 shaped thereon. This incline 343 will stand to the left of the pin 344 in Fig. 13 (as indicated by dotted lines in Fig. 14) if the machine is in normal order. Below the incline 343 is the front end of a lever 345 mounted on the bearing 346 which is fastened in a suitable manner to the back plate of the carriage. The front end of the lever 345 has a pin 344 mounted thereon, the top end of which meshes with the incline 343 of the drum 342 so that the pin 344 and thereby the lever 345 will be moved either to the right of Fig. 17 into the position shown in Fig. 34 if the drum with the incline 343 is moved from the normal position into the position shown in Fig. 13. If, on the other hand, the segment is reversely moved from the position shown in Fig. 13 to its normal position, then by the backward movement of the same incline the pin 344 of the lever 345 will be moved from its normal middle position to the left so that by the forward or backward movement of the incline, the lever 345 will either be moved to the right or to the left from its normal middle position. The lower end of the pin 344 extends into a groove 347 of the ring 348, so mounted that it can slide on the axis 70 but will turn with it. It has two single teeth 349 and 350 sliding with it, one of which may come into mesh with the gear segment 351 (Figs. 13, 17 and 35) which is fastened on the axis 66 of yoke 65 so that it will turn the yoke. But the segment 351 will not slide with the axis of the yoke, as it is held steady between the arms of the forked bearing 352.

Now it must be remembered from the whole mechanism described, that, if the incline 343 moves the pin 344, either in one or the other direction, out of its middle position, then either one of the teeth 349 or 350, which are rotating with the axis 70, will turn the segment 351. Now as it is known, the axis 70 will be turned in one way in addition, in the opposite way in subtraction; wherefore both the two teeth 349 and 350 will be turned in different directions if addition or if subtraction is performed. If therefore the segment 351 will be moved by one of the teeth 349 and 350 during a subtraction, then the segment 351 and thereby the yoke 65 will be turned in such a direction that the yoke 65 is put out of its subtracting position into the adding position. The lever 345 is then always brought back to its middle position in the course of the same subtraction and before the end of any addition or subtraction, so that, if then during the next calculation the incline 343 would again pass the pin 344, it will always have to move this pin 344. This readjusting of lever 345 is done by the inclines 355 which are fastened to the ring 355ª, as will be seen from Fig. 14, and which ring 355ª is always turned in the same direction as it is fastened to the axis 92. The inclines 355 will return the lever 345 just before the completion of an addition or subtraction to its center position shown in Fig. 14 as the pin 420 of the lever 345 will be slid to the center by the two inclines 355.

If therefore, after such a subtraction, during which the mechanism just described has been actuated, the incline 343 will now be moved backward and pass the pin 344 again, then the pin 344 will be pushed this time from its middle position to the left of Fig. 17, whereby now the teeth 349 will come in mesh with the segment 351, and as now during an addition the axis 70 and thereby the teeth 349 will be turned in an opposite direction to that described in "Subtraction", the yoke 65 will now, during an addition, be turned oppositely, i. e., out of its adding position shown in Fig. 13, into its subtracting position shown in Fig. 6.

The advantage of this construction to move the yoke according to the passing of the first left-hand numeral wheel, from zero to nine or from nine to zero over the similar construction shown in my before-mentioned patent, is the following: The yoke 65 must now not be turned directly by the numeral wheel, but can be turned by the axis 70 by way of the teeth 349 and 350, which axis 70 gets the power from the motor in a very direct way, and therefore will be able to transfer considerable power for moving the yoke 65. While, on the other hand, the first left-hand numeral wheel may be moved from zero to nine, as is known, in a very indirect way, in which various mechanisms interfere before the power of the motor is given to the first left-hand numeral wheel, which therefore will not be able to transfer a very considerable part of the power of the motor to the yoke, so that the yoke 65 may now be pressed strongly against one of the pins 63 or 64, by the power of the motor.

Now therefore, if the machine is started for division, the carriage 2 will be put to the first subtracting position and there subtractions will be performed until the first left-hand numeral wheel will pass from zero to nine, in consequence of the divisor having been subtracted once more from the dividend than it could be subtracted. Then the yoke 65 will be turned out of the subtracting pin 63 into the next adding pin 64, the carriage will make one short step into its adding position. Thereupon the machine will make one addition, in consequence of which the mistake made before by subtracting too much will be corrected and the first left-hand numeral wheel will pass back again from nine to zero. Now thereby the yoke 65 will be again put out from the adding pin 54 into the next subtracting pin 63, the carriage will make one short step again and will be fastened in the subtracting position, i. e., the next subtracting position from the position taken before, so that the divisor will now be subtracted from the next lower digit of the dividend. In this position the same procedure as before will be repeated. There will be subtracted too much again, then the fault corrected, then subtracted on the next lower digit, then the fault corrected again, and so forth.

The number of subtractions which can properly be made on each digit indicates the quotient which was to be found. The number of subtractions is registered on each digit through the worms 29 and 30. The worm 30 will move during the subtracting, one of the racks 28 and thereby one of the buttons 27 from zero against 1, 2, 3, 4, etc., of its scale, moving the buttons thereby one step or one number during each subtraction, whereby the number of times which the divisor can be subtracted from each digit of the dividend will be registered successively by successive automatic movements of the buttons 27 to certain positions along their scales, so that after the completion of the calculation, the proper quotient can be read by the operator in row $b$.

It may be mentioned expressly that the quotient will appear properly in row $b$ in spite of the fact that the divisor is subtracted on each digit once too much. While, it is true, the buttons 27 will first be moved by the worm 30 to a higher figure than the proper quotient, on the other hand the buttons 27 will be moved back one digit again during the addition, which corrects every one of these excessive subtractions to the proper figure of the quotient, as during each addition the buttons 27 will be moved backward by the worm 29, as described before. In the same manner as described in "Multiplication" the lever 25 will be returned, after the completion of a division, to a rest position in the middle of the slot 12. This will be done by the arm 295, which has the same function as the arm 294 (Fig. 27) in multiplication, and is turned by the arm 294 through the segments 299 and 300. And if it is desired to lock the lever 25 in its dividing position, then of course a spring 362 could be applied to the other side of the slot 12 where it could be pressed backward for moving the lever 25 by a pin 361 fastened to the lever 296 as described for multiplication.

If the machine is started for division, and no divisor has been set up in the first left-hand slot 5 (Fig. 1) and a figure has been set up on the first left-hand numeral wheel, then the machine may have to perform more than ten subtractions on the first digit, and the first button 27 may consequently have to register more than nine, which could not be done and must be prevented. I employ for this purpose a sliding bar 370 (Figs. 2, 27) which is slidably mounted in screws 374 and 380. The one end 371 of this bar extends below the slot 12 in such a manner that the whole bar must be moved to the left, if the lever 25 is put into its position "division." This movement is obstructed if the first left-hand button 7 has remained in its 0 position, as then the right end 372 of the slide bar catches itself on the arm 125 of the first left-hand button 7 (Fig. 13ᵃ). Thus the first left-hand button 7 must have been at least moved to the number 1 of its scale before lever 25 could be moved to "division."

If the machine is started for division in a condition in which a warning shield has appeared below orifice 20, then the machine would not be able to divide properly, as the incline 343 is then in an unfit position to regulate the subtractions as is its destination in division. Therefore means are provided which prevent a moving of the lever 25 to "division" if the "wrong" shield is visible below orifice 20.

Fastened to the wrong shield disk 315 is an eccentric disk 362 (Figs. 2 and 17) in such a way that it is in the position shown in Fig. 2, if the machine is in working order. Then the tooth 390 will stand opposite the downward bent arm 363 of a slide bar 364 (Figs. 2 and 27) which is slidably fastened with the screws 369 to the top plate of the carriage, so that the bar 364 could not be pressed backward. But if a warning shield has appeared, then the bar 364 will be able to be pressed backward, a certain distance, as then the disk 362, being fastened to the warning shaft, will be turned into such a position that the tooth 390 does not obstruct the sliding of bar 364. Consequently if the carriage returns into its initial position in normal condition, i. e., with the slide bar movement obstructed, the front end 365 of the bar 364 will press back (into the position in Fig. 27) a swinging bar 366 which can turn around its screw 368 fastened to the top plate 292 of the casing. Then the lever 25 can be moved to "division." But if the bar 364 is not obstructed in consequence of the machine being not in normal condition, then the arm 366 will, under the pressure of its spring 367, push back the bar 364 and thereby swing forward, so that the front end 377 of its downward bent arm 376 comes before a catch 375 provided for that purpose on the bar 370, so that this bar could not be moved to the left, and therefore, in the manner known, would obstruct the slot 12 so that the lever 25 could not be moved to "division." As the lever 366 would always be pressed forward by its spring, unless pressed back by the bar 364, the problem is solved to not allow a starting for "division" if the carriage is not in its initial position, and of course in working order, too.

Thus it will be seen that all means are provided to prevent the machine to come to a standstill during a division. I have still to mention, that (as will be seen from Figs. 1, 13 and 27) pins 400 are provided along the slots 5 and 26. These pins represent improved means for adjusting the buttons 7 and 27 in their slots. Until now, the movement of such buttons in such slots to distinct positions, had to be done very carefully or the operator would have overreached the mark in sliding such buttons. Now, as shown in Fig. 13, he has only to slide the button against his one finger, which he inserts behind such a pin 400 and as the backs of the buttons are formed to harmonize with the back of the pin, the button will be easily adjusted in one line with the pin in the proper position.

*The canceling mechanism.*

Means are provided to cancel the figures which have appeared in row *a* after a calculation and before the beginning of a new one. They are illustrated in Figs. 6, 15, 17, 17ᵃ, 18, 27, 28, 29 and 30. Similarly as shown before, a crank 106 (Figs. 17, 27 and 30) is provided by which the axis 405 can be turned, on which is fastened a bevel gear 419 which drives a bevel gear 418 (Figs. 17 and 18). Gear 418 is secured to axis 101 on which a set of gear segments 102 are provided (Figs. 6, 15 and 18), which can mesh with gear segments 104, which are connected with the numeral wheels 23. The segments 102 and 104 are shaped in such a way, that segment 102 is free to turn if the crank 106 and the segments 104 are in their rest position. But if the crank 106 and thereby the gears 102 are turned, they will turn the gears 104 as long until it comes into the position shown in Figs. 15 and 6, in which position its numeral wheel 23 will be in its zero position. Thereby all the numeral wheels 23 will be put to 0 by one rotation of the crank 106.

As the machine should not be started if the crank 106 is not in proper position, and the crank should not be turned if the carriage is not in proper position, I have provided the crank 106 with a disk 402 which can rotate through a recess of a bar 417, (which bar is fastened to the casing 1,) provided the carriage is in normal position, (Fig. 1). In any other position of the carriage, the crank 106 will be prevented from being turned. On the other hand, if the crank 106 has been turned and therefore the disk 402 has entered the recess, the carriage 2 could not be started and a calculation could not be commenced therefor, until the crank 106 is again in normal position. Then the flat part of the disk 402 will stand opposite the bar 417 and will allow a movement of the disk along the bar.

I have connected improved means with this disk and the bar, which will prevent mistakes in consequence of a starting from a new calculation, if the result of a previous calculation has not been canceled. Secured to the bar 417 with the pivot screw 406 (Figs. 2, 8, 27, 30) is a lever 407, which has a pin 409 extending downward through a hole of the bar 417, so that it can extend into a recess 414 of the top plate of the carriage. It is pressed into the recess by the spring 408 which presses the lever 407 forward as shown in Fig. 28. Thus a movement of the carriage and therefore a starting of the machine is prevented. But if the crank 106 has been turned, and thereby the result of a previous calculation has been canceled properly, then the carriage shall be released from the pin 409 and free to be moved. This is accomplished by the pin 403 which is fastened to the disk 402 and presses backward the lever 407 by pressing against its front arm 415. If crank 106 is being rotated the arm 407 will then be put into the position shown in Fig. 27 and will be retained in such position as the spring 411 which is screwed to the bar 417, will snap in front of a catch 410 of the lever 407 and thus retain it. The carriage is then free to be moved. Now as soon as the carriage is moving to the left, the incline 416 (Fig. 29) which is fastened to the top plate of the carriage, will move below the pin 413 which is riveted to the spring 411 and thereby the spring 411 will be elevated a moment over the catch 410, so that the lever 407 can follow the pushing of the spring 408, whereby the pin 409 will be pressed forward and lie against the back of the top plate of the carriage (as shown in Fig. 30). As soon as the carriage then returns again to its initial position, the pin 409 will fully snap into the recess 414 and therefore the crank 106 must be turned again before starting for a new calculation.

As the apparatus described will not be needed in every case, it may be made inactive by inserting a pin before the lever 487 into the hole 451, whereby the lever 407 will be prevented from locking the carriage.

As a matter of course, the apparatus for adjusting the decimal point, which has been described in my U. S. Patent No. 809,075, could be adjusted to my present machine just as well as this apparatus is entirely mounted on the top plates of the machine, as well on the casing as on the carriage. And as nothing has been changed in my machine which could make necessary any change in this decimal point setting apparatus for mounting it to my new machine, I do not think it necessary to describe this decimal point setting apparatus in this present application.

What I claim as new is:

1. In a calculating machine, the combination with registering devices, of operating devices adapted to turn the registering devices to an extent independently predetermined, and a carrying mechanism adapted to thereafter simultaneously transfer the tens from the lower to the higher digits, including a gear slidable on its axis, while the registering devices are operated by the operating devices and locked on its axis during the transfer of the tens.

2. In a calculating machine, the combination with registering devices, of operating devices, adapted to turn the registering devices, a carrying mechanism, a shaft for actuating the operating devices, a shaft for actuating the carrying mechanism, a main shaft, and gear segments to rotate the first said two shafts from the main shaft.

3. In a calculating machine, the combination with a carriage, of registering devices, operating devices adapted to turn the registering devices, means for shifting the carriage, means for actuating the operating devices independently of the carriage, and common driving means adapted to move the actuating means of the operating devices and to shift the carriage.

4. In a calculating machine, the combination of the shifting carriage, registering devices contained therein, a movable yoke mounted on the carriage, stopping pins in the path of the yoke, a lever, operating devices, and means to stop the operating devices by the lever when the yoke is released from the stopping pins.

5. In a calculating machine, the combination of means for simultaneously setting up two figures of one or more digits, a movable carriage, registering devices therein, means automatically adapted to move the carriage into a proper position for addition, and means to add the two figures set up.

6. In a calculating machine, the combination of means for simultaneously setting up two figures of one or more digits, a movable carriage, registering devices mounted thereon, means adapted to add the two figures set up, and means to return the carriage automatically to an initial position, after the completion of the calculation.

7. In a calculating machine, the combination of an electric motor, with operating means driven by the motor, registering devices, means to reverse the movement of the motor, and means to interrupt the circuit of the motor after the completion of the movements of the machine, said operating means turning the registering devices to an extent dependent upon the figure to be calculated.

8. In a calculating machine, the combination of an electric motor, with operating devices driven by the motor, registering devices, means to close the circuit of the motor for starting the machine, means to automatically stop the motor after the completion of the calculation, means to reverse the rotation of the motor, and means to interrupt the circuit after the completion of the movement of the machine, said operating means turning the registering devices to an extent dependent upon the figure to be calculated.

9. In a calculating machine, the combination of an electric motor, with operating means driven by the motor, registering devices, means to reverse the rotation of the motor, and means to interrupt the circuit for the reverse rotation of the motor only, said operating means turning the registering devices to an extent dependent upon the figure to be calculated.

10. In a calculating machine, the combination of means for setting up a divisor, means for setting up a dividend including registering wheels, means to automatically divide the dividend by the divisor and register the result thereof, including a main axis, and means adapted to prevent the numeral wheels from passing from 0 to 9 or 9 to 0 when the main axis of the machine is at rest.

11. In a calculating machine, numeral wheels, means for setting up a divisor, means for setting up a dividend on the numeral wheels, means to prevent such numeral wheels from passing a certain position during such a setting up, and means to automatically perform the operation of division, and to register the result thereof.

12. In a calculating machine, the combination of numeral wheels, means for setting up a divisor, means for setting up a dividend on the numeral wheels, a common slide bar adapted to be slid upon one of the numeral wheels passing a given position, and means to lock said slide bar against such movement.

13. In a calculating machine, the combination of numeral wheels, a carriage having an orifice, a warning shield, and means connecting the first left-hand numeral wheel with said shield whereby the shield is caused to appear below the orifice, upon the first left-hand numeral wheel passing a given position.

14. In a calculating machine, the combination of registering wheels, means adapted to warn the operator against a further continuation of operating with the machine if the first left-hand registering wheel passes a given position, and means to render the said device inactive if the first left-hand registering wheel again passes the said given position, and devices connected with the first left-hand registering wheel adapted to so actuate said means.

15. In a calculating machine, the combination of means for setting up a minuend, means for setting up a subtrahend, means adapted to perform the subtraction of the subtrahend from the minuend, an electric motor for driving such means, means adapted to automatically electrically connect the circuit for the motor when the machine is started, and means to automatically electrically disconnect the motor if the machine has completed the calculation.

16. In a calculating machine, the combination of means for setting up two sums, means to perform the addition of the two sums, a carriage, an electric motor for driving such last named means, means to automatically electrically connect the motor by the starting of the machine, means to automatically disconnect the motor when the machine has completed its calculation, and means to automatically move the carriage.

17. In a calculating machine, the combination of devices for setting up a multiplier, devices for setting up a multiplicand, means for performing the multiplication, including a forwardly and backwardly shiftable carriage, and a motor for actuating such means and adapted to automatically shift the carriage forward and backward.

18. In a calculating machine, the combination of devices for setting up a multiplier, devices for setting up a multiplicand, means for performing the multiplication, including a forwardly and backwardly movable carriage, and a motor for actuating such means, and adapted to automatically shift the carriage forward and backward, dependent upon the direction in which the motor is turning.

19. In a calculating machine, the combination of devices for setting up a multiplier, devices for setting up a multiplicand, means for performing the multiplication, including a forwardly and backwardly shiftable carriage, an electric motor for actuating such means, and adapted to shift the carriage forwardly and backwardly dependent upon the direction in which the motor is turning, and a pole changer adapted to reverse the direction in which the motor is turning.

20. In a calculating machine, the combination with means for setting up a multiplicand, of means for setting up a multiplier, means for performing the multiplication, an electric motor for actuating such means, a device for interrupting the electric circuit, and automatic means to actuate the said device to stop the electric motor after the end of a multiplication.

21. In a calculating machine, the combination of devices for setting up a multiplier, devices for setting up a multiplicand, means for performing the multiplication, an electric motor adapted to actuate such means, and a pole changer adapted to reverse the rotation of the electric motor, automatically, upon obtaining the result of the calculation.

22. In a calculating machine, the combination with means for performing multiplication by repeated additions, of automatic means to stop the addition of each digit, including a bar 285, two levers 286 upon which it is mounted, an axis 70 for said levers, and a yoke 65 on which one arm 287 of the levers 286 is adapted to be pressed for stopping the additions.

23. In a calculating machine, the combination of means for setting up a multiplier, means for setting up a multiplicand, means for performing the multiplication, an adjusting lever adapted to start said means, means for moving the lever out of an initial position to effect the starting, means adapted to return the lever automatically to its initial position, and means adapted to positively prevent the return of the lever until it has been returned automatically.

24. In a calculating machine, the combination of means for setting up a multiplier, means for setting up a multiplicand, means adapted to perform the multiplication, an adjusting lever adapted to start said means, means adapted to move the lever out of an initial position, and into a position to start multiplication, and means adapted to automatically return the lever to its initial position.

25. In a calculating machine, the combination of the casing, operating devices contained therein, a carriage, registering devices contained in the carriage, means for moving the carriage to different denominations, and means to automatically limit this movement of the carriage to certain denominations.

26. In a calculating machine, the combination of devices for setting up a divisor, devices for setting up a dividend, means for performing the division, including means for forwardly and backwardly shifting the carriage, an electric motor for actuating such means, and means for changing the direction of motor rotation to control the direction of carriage travel, such directing changing means comprising a pole changer for the motor.

27. In a calculating machine, the combination of means for setting up a dividend, means for setting up a divisor, means for performing division, an electric motor adapted to actuate such means, a circuit interrupter, and automatic means adapted to stop the electric motor after the end of a division by actuating said interrupter.

28. In a calculating machine, the combination of means for setting up a dividend, and means for setting up a divisor, with means for performing division, an adjusting lever adapted to be moved out of an initial position for starting these means, and means adapted to positively prevent a return of the lever until the division is completed.

29. In a calculating machine, the combination of means for setting up a dividend, and means for setting up a divisor, with means adapted to perform divison, an adjusting lever adapted to be moved out of an initial position for starting these means, means to return the lever automatically to its initial position, after the calculation is completed, and means to prevent a returning of the lever until it is returned automatically.

30. In a calculating machine, the combination of means for setting up a dividend, and means for setting up a divisor, with means adapted to perform division, a lever adapted to be moved out of initial position in order to start these means for division, and means to automatically return the lever to its initial position.

31. In a calculating machine, the combination with means for performing division, including means for setting up a divisor, of a lever for adjusting or starting these means for division, and means to prevent such an adjusting or starting, if no divisor has been set up.

32. In a calculating machine, the combination with means for performing division, including means for setting up a divisor, of a lever for adjusting or starting these means for division, and means to prevent such an adjusting or starting if no divisor is set up on the highest digit of the means for setting up the divisor.

33. In a calculating machine, the combination with a movable carriage, of registering devices therefor, and means adapted to prevent a starting of the machine for a calculation except when the carriage is in its initial position.

34. In a calculating machine, the combination of means for setting up a dividend, means for setting up a divisor, means adapted to perform division, including a movable carriage, a lever for adjusting or starting these means for a division, and means adapted to prevent such an adjusting or starting if the carriage is not in its proper position.

35. In a calculating machine, the combination of means for setting up a dividend, means for setting up a divisor, means adapted to perform division, a lever for adjusting or starting these means for division, and means adapted to prevent such an adjusting or starting if the machine is not in proper condition.

36. In a calculating machine, the combination of means for setting up a dividend, means for setting up a divisor, means adapted to perform division, a lever for adjusting or starting these means for a division, and means adapted to prevent such an adjusting or starting if the capacity of the machine has been overreached in the previous calculation.

37. In a calculating machine, the combination of operative means, selective buttons slidable to different positions in slots, and devices mounted along the slots in such positions that the backs of the elevations of these devices harmonize or coincide with the backs of the buttons in each position, when the buttons are in proper position.

38. In a calculating machine, the combination of registering devices, canceling means adapted to return the registering devices to their 0 position, and means to prevent the operation of the machine if the canceling means have not been actuated since the last calculation.

39. In a calculating machine, the combination of means for performing either an addition, substraction, a division, or for performing a multiplication, including means for setting up a figure, of canceling means adapted to return the means for setting up to their 0 position, and means adapted to prevent the operation of the machine if the canceling means have not been actuated previously.

40. In a calculating machine, the combination with means for performing additions and subtractions, including numeral wheels, of means adapted to change the action of the machine from subtraction to addition after the capacity of the machine has been overreached, devices for actuating said changing means, and means to put said actuating devices in operative position if a numeral wheel passes a given position.

41. In a calculating machine provided with a plate having a slot therein, the combination of a slidable shaft, a lever secured to the shaft projecting through the slot and adapted to be moved from a normal intermediate position to either end of said slot, and a pawl automatically operated to secure the lever against accidental movement from either end position.

42. In a calculating machine provided with a plate having a slot therein, the combination therewith of a lever adapted to be moved to either end of said slot, a pawl automatically operated to secure the lever against accidental movement from either of such positions, a sliding carriage, an adjustable stop thereon, and means actuated by said stop at the termination of the carriage movement to release the pawl.

43. In a calculating machine, the combination with the stationary top provided with a slot having an end space, of a starting lever adapted to be moved into said end space to start the machine, a pawl normally in position to secure the starting lever in such position, a sliding carriage, a terminal pin thereon, a slidable plate on the stationary portion of the machine in the path of the pin, and connections whereby the pawl, at the termination of the operation of the carriage, is released by said slidable plate.

44. In a calculating machine, the combination with the stationary top provided with a slot having two end spaces, of a starting lever adapted to be moved into either of said end spaces to start the machine, two pawls normally in position to secure the starting lever in either of such positions, a sliding carriage, a terminal pin thereon, a slidable plate on the stationary portion of the machine in the path of the pin, and connections whereby the pawls, at the termination of the operation of the carriage, are released by said slidable plate.

45. In a calculating machine, the combination with a slidable slotted plate and a lever projected through its slot, of means for setting up a number, and a locking bar for the slotted plate brought into operation by bringing the setting means to zero.

46. In a calculating machine, the combination with a slidable slotted plate and a lever projected through its slot, of means for setting up a number, and a locking bar for the slotted plate withdrawn from operation by setting up a number greater than zero.

47. In a calculating machine, the combination of means for setting up a multiplicand, means for setting up a multiplier, means adapted when put in operation automatically to perform the operation of multiplication and to register the result thereof including a main shaft, a motor, and means to transfer the pressure of the motor to the main shaft at the beginning of each digit operation.

48. In a calculating machine, the combination of means for setting up a multiplicand, means for setting up a multiplier, means adapted when put in operation automatically to perform the operation of multiplication and to register the result thereof including a main shaft, and motor means to take off the pressure from the main shaft at the end of each digit operation.

49. In a calculating machine, the combination of means for setting up a multiplicand, means for setting up a multiplier, means adapted when put in operation automatically to perform the operation of multiplication and to register the result thereof including a main shaft, a motor, and means to transfer the pressure of the motor to the main shaft at the beginning of each digit operation and to take off the pressure from the main shaft at the end of each digit operation.

50. In a calculating machine, the combination of means for setting up a dividend, means for setting up a divisor, means adapted when put in operation automatically to perform the operation of division and to register the result thereof including a main shaft, a motor, and means to transfer the pressure of the motor to the main shaft at the beginning of each digit operation.

51. In a calculating machine, the combination of means for setting up a dividend, means for setting up a divisor, means adapted when put in operation automatically to perform the operation of division and to register the result thereof including a main shaft, a motor, and means to take off the pressure from the main shaft at the end of each digit operation.

52. In a calculating machine, the combination of means for setting up a dividend, means for setting up a divisor, means adapted when put in operation automatically to perform the operation of division and to register the result including a main shaft, a motor, and means to transfer the pressure of the motor to the main shaft at the beginning of each digit operation and to take off the pressure from the main shaft at the end of each digit operation.

53. In a calculating machine, the combination with registering devices and operating devices for the same, of a motor, a lever, and a driving connection between the motor and the operating devices adapted to be automatically interrupted if the pressure of the motor upon the operating devices exceeds a certain limit and for being thereafter readjusted by a movement of the lever so as to form again the driving connection.

54. In a calculating machine, the combination with a casing, of a carriage, operating and registering devices one of which are mounted on the carriage, means to move the carriage to different positions during a calculation and to return the carriage to its initial position after the end of a calculation, a motor, and means for forming a driving connection between the motor and the means to return the carriage.

55. In a calculating machine, the combination with a casing, of a carriage, operating and registering devices one of which are mounted on the carriage, means to move the carriage to different positions during a calculation, automatic means to return the carriage to its initial position after the end of a calculation, and a lever mechanism actuated at the end of a calculation and adapted to put into action the returning means for the carriage.

In testimony wherof I affix my signature in the presence of two witnesses.

ALEXANDER RECHNITZER.

Witnesses:
WOLDEMAR HAUPT,
HENRY HASPER.